(12) United States Patent
Kokuryo et al.

(10) Patent No.: US 10,547,033 B2
(45) Date of Patent: Jan. 28, 2020

(54) PACKAGING MATERIAL FOR BATTERIES, AND BATTERY

(71) Applicant: DAI NIPPON PRINTING CO., LTD., Tokyo (JP)

(72) Inventors: Toshishige Kokuryo, Tokyo (JP); Rikiya Yamashita, Tokyo (JP); Takanori Yamashita, Tokyo (JP); Daisuke Yasuda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 221 days.

(21) Appl. No.: 15/557,781

(22) PCT Filed: Mar. 25, 2016

(86) PCT No.: PCT/JP2016/059745
§ 371 (c)(1),
(2) Date: Sep. 12, 2017

(87) PCT Pub. No.: WO2016/158797
PCT Pub. Date: Oct. 6, 2016

(65) Prior Publication Data
US 2018/0076423 A1    Mar. 15, 2018

(30) Foreign Application Priority Data

Mar. 27, 2015  (JP) ................................ 2015-066284
Oct. 22, 2015  (JP) ................................ 2015-208088

(51) Int. Cl.
*H01M 2/02* (2006.01)
*B32B 15/08* (2006.01)
(Continued)

(52) U.S. Cl.
CPC ............. *H01M 2/0287* (2013.01); *B32B 7/12* (2013.01); *B32B 15/08* (2013.01); *B32B 15/18* (2013.01);
(Continued)

(58) Field of Classification Search
None
See application file for complete search history.

(56) References Cited

U.S. PATENT DOCUMENTS

2008/0286635 A1   11/2008  Seino et al.
2009/0029245 A1*   1/2009  Ibaragi .................... B32B 15/08
                                                      429/176
(Continued)

FOREIGN PATENT DOCUMENTS

JP    2008-287971 A    11/2008
JP    2010-194759 A     9/2010
(Continued)

OTHER PUBLICATIONS

English Translation of JP 2011-076956 (Year: 2011).*
(Continued)

*Primary Examiner* — Wyatt P McConnell
(74) *Attorney, Agent, or Firm* — Oliff PLC

(57) ABSTRACT

A packaging material for batteries, which has high puncture strength, while having excellent moldability and electrolyte solution resistance. A packaging material for batteries, which is formed of a laminate that sequentially includes at least a base layer, a stainless steel foil and a thermally fusible resin layer in this order, and wherein an acid-resistant coating film layer is formed on at least the thermally fusible resin layer-side surface of the stainless steel foil.

17 Claims, 3 Drawing Sheets

(51) Int. Cl.
*B32B 15/18* (2006.01)
*B32B 7/12* (2006.01)
*H01M 10/00* (2006.01)

(52) U.S. Cl.
CPC ....... *H01M 10/00* (2013.01); *B32B 2309/105* (2013.01); *B32B 2553/00* (2013.01)

(56) References Cited

U.S. PATENT DOCUMENTS

2013/0209868 A1* 8/2013 Suzuta ................ H01M 2/0275
 429/176
2014/0242450 A1* 8/2014 Oono .................... B32B 15/088
 429/176

FOREIGN PATENT DOCUMENTS

| JP | 2011-076956 A | 4/2011 |
| JP | 2014-157727 A | 8/2014 |
| WO | 2007/072604 A1 | 6/2007 |
| WO | 2011/093283 A1 | 8/2011 |
| WO | 2012/050182 A1 | 4/2012 |
| WO | 2013/069704 A1 | 5/2013 |

OTHER PUBLICATIONS

Machine Translation of JP 2014-157727 (Year: 2014).*
Jun. 28, 2016 International Search Report issued in International Patent Application No. PCT/JP2016/059745.

* cited by examiner

PACKAGING MATERIAL FOR BATTERIES, AND BATTERY

TECHNICAL FIELD

The present invention relates to a battery packaging material and a battery.

BACKGROUND ART

Various types of batteries have been developed heretofore, and in every battery, a packaging material is an essential member for sealing battery elements such as an electrode and an electrolyte. Metallic packaging materials have been often used heretofore as battery packages, but in recent years, batteries have been required to be diversified in shape, and desired to be thinner and lighter as performance of, for example, electric cars, hybrid electric cars, personal computers, cameras and mobile phones has been enhanced. However, metallic battery packaging materials that have often been heretofore used have the disadvantage that it is difficult to keep up with diversification in shape, and there is a limit on weight reduction.

Thus, in recent years, a film-shaped laminate with a base material layer, a metal layer and a heat-sealable resin layer laminated in this order has been proposed as a battery packaging material which is easily processed into diversified shapes and is capable of achieving thickness reduction and weight reduction (see, for example, Patent Document 1). In such a battery packaging material, generally, a concave portion is formed by cold molding, battery elements such as an electrode and an electrolytic solution are disposed in a space formed by the concave portion, and heat-sealable resin layers are heat-welded to obtain a battery with battery elements stored in the battery packaging material.

For obtaining a battery packaging material having excellent moldability, an aluminum foil is widely used as a metal layer in such a film-shaped laminate.

PRIOR ART DOCUMENT

Patent Document

Patent Document 1: Japanese Patent Laid-open Publication No. 2008-287971

SUMMARY OF THE INVENTION

Problems to be Solved by the Invention

In recent years, a battery packaging material has been required to have a further reduced thickness for increasing the energy density of a battery, and further reducing the size of the battery. A large impact may be applied to a product during production of a battery, transportation or use of a product including a battery, or the like. Here, a large external force may be applied from the inside or outside to a battery packaging material containing a battery element.

While an attempt has been made to reduce the thickness of a metal layer in connection with the need to reduce the thickness of a battery packaging material as described above, aluminum is excellent in moldability, but has low rigidity, and when a large external force is applied from the inside or outside of the battery packaging material, aluminum may be bored, leading to exposure of a battery element to the outside.

Under these circumstances, a metal having high rigidity, such as stainless steel or titanium steel may be used in place of aluminum. In general, however, stainless steel has low moldability while having high rigidity (piercing strength), and therefore has the problem that pinholes, cracks and the like are easily generated in a stainless steel foil in molding of a battery packaging material. Therefore, in the present circumstances, a stainless steel foil is rarely used in a thin battery packaging material.

A main object of a first invention of the present invention is to provide a battery packaging material having high piercing strength and excellent electrolytic solution resistance and moldability although a stainless steel foil is laminated on a laminate.

A main object of a second invention of the present invention is to provide a battery packaging material having high piercing strength and excellent moldability although a stainless steel foil is laminated on a laminate.

Means for Solving the Problems

The present inventors have extensively conducted studies for achieving the above-mentioned object, and resultantly found that when in a battery packaging material including a laminate including at least a base material layer, a stainless steel foil and a heat-sealable resin layer in this order, an acid resistance film layer is formed on the stainless steel foil on at least the heat-sealable resin layer side, the battery packaging material has high piercing strength and excellent electrolytic solution resistance and moldability.

Further, the present inventors have found that in a battery packaging material including an austenite-based stainless steel foil as a stainless steel foil, a battery packaging material provided with a specific acid resistance film layer, a battery packaging material which is black on the base material layer side, and a battery packaging material with an upper limit set to the melt flow rate (MFR) of a heat-sealable resin layer, an excellent effect is exhibited in piercing strength, moldability and electrolytic solution resistance, and deterioration of airtightness and reduction of sealing strength due to positional displacement of a heat-sealing surface, etc. after heat-sealing, which easily occurs when a stainless steel foil is used, can be effectively suppressed.

A first invention has been completed by further conducting studies based on the above-mentioned findings. That is, the first invention provides an invention of the aspects described below.

Item 1A. A battery packaging material including a laminate including at least a base material layer, a stainless steel foil and a heat-sealable resin layer in this order, wherein
an acid resistance film layer is formed on the stainless steel foil on at least the heat-sealable resin layer side.

Item 2A. The battery packaging material according to item 1A, wherein the stainless steel foil is formed of austenite-based stainless steel.

Item 3A. The battery packaging material according to item 1A or 2A, wherein the stainless steel is SUS 304 stainless steel.

Item 4A. The battery packaging material according to any one of items 1A to 3A, wherein the acid resistance film layer is formed by a phosphoric acid chromate treatment using a resin.

Item 5A. The battery packaging material according to any one of items 1A to 4A, wherein the resin to be used in the phosphoric acid chromate treatment is a phenol resin.

Item 6A. The battery packaging material according to any one of items 1A to 5A, wherein at least one of the layers situated on the base material layer from the stainless steel foil is black.

Item 7A. The battery packaging material according to any one of items 1A to 6A, wherein an adhesive layer is laminated between the base material layer and the stainless steel foil, and the adhesive layer is colored black.

Item 8A. The battery packaging material according to any one of items 1A to 7A, wherein the heat-sealable resin layer has a melt flow rate (MFR) of 15 g/10 minutes at 230° C.

Item 9A. The battery packaging material according to any one of items 1A to 8A, further including an adhesive layer between the stainless steel foil and the heat-sealable resin layer.

Item 10A. The battery packaging material according to any one of items 1A to 9A, wherein a thickness of the stainless steel foil is 40 μm or less.

Item 11A. The battery packaging material according to any one of items 1A to 10A, wherein a total thickness of the laminate is 110 μm or less.

Item 12A. The battery packaging material according to any one of items 1A to 11A, wherein where T is a total thickness (μm) of the laminate, TS is a thickness (μm) of the stainless steel foil, and F is a piercing strength (N) of the laminate as measured by a measurement method conforming to JIS Z 1707 1997, F/T is 0.3 (N/μm) or more, and F/TS is 0.7 (N/μm) or more.

Item 13A. The battery packaging material according to any one of items 1A to 12A, wherein an acid resistance film layer is formed on the stainless steel foil on at least the heat-sealable resin layer side, and the acid resistance film layer contains a phosphorus compound in an amount of 100 mg or more in terms of phosphorus per 1 $m^2$ of surface area of the stainless steel foil 3.

Item 14A. A battery, wherein a battery element including at least a positive electrode, a negative electrode and an electrolyte is contained in a package formed of the battery packaging material according to any one of items 1A to 13A.

The present inventors have extensively conducted studies for achieving the above-mentioned object, and resultantly found that when in a battery packaging material including a laminate including at least a base material layer, a stainless steel foil and a heat-sealable resin layer in this order, a first protective layer and a second protective layer each having an elastic modulus of 100 MPa or more as measured by a method conforming to JIS K7127 are provided on both sides of the stainless steel foil, the battery packaging material has high piercing strength and excellent moldability.

A second invention has been completed by further conducting studies based on the above-mentioned findings. That is, the second invention provides an invention of the aspects described below.

Item 1B. A battery packaging material including a laminate including at least a stainless steel foil having a first surface and a second surface, a base material layer laminated on the first surface, and a heat-sealable resin layer laminated on the second surface, wherein at least one layer laminated on the first surface of the stainless steel foil forms a first protective layer having an elastic modulus of 100 MPa or more as measured by a method conforming to JIS K7127, and at least one layer laminated on the second surface of the stainless steel foil forms a second protective layer having an elastic modulus of 100 MPa or more as measured by a method conforming to JIS K7127.

Item 2B. The battery packaging material according to item 1B, wherein the base material layer forms the first protective layer.

Item 3B. The battery packaging material according to item 1B or 2B, including the second protective layer between the stainless steel foil and the heat-sealable resin layer.

Item 4B. The battery packaging material according to any one of items 1B to 3B, wherein the stainless steel foil is formed of austenite-based stainless steel.

Item 5B. The battery packaging material according to any one of items 1B to 4B, wherein an acid resistance film layer is provided on at least one of the first surface and the second surface of the stainless steel foil.

Item 6B. The battery packaging material according to any one of items 1B to 5B, further including an adhesive layer between the stainless steel foil and the heat-sealable resin layer.

Item 7B. The battery packaging material according to any one of items 1B to 6B, wherein a thickness of the stainless steel foil is 40 μm or less.

Item 8B. The battery packaging material according to any one of items 1B to 7B, wherein a total thickness of the laminate is 110 μm or less.

Item 9B. The battery packaging material according to any one of items 1B to 8B, wherein where T is a total thickness (μm) of the laminate, TS is a thickness (μm) of the stainless steel foil, and F is a piercing strength (N) of the laminate as measured by a measurement method conforming to JIS Z 1707 1997, F/T is 0.3 (N/μm) or more, and F/TS is 0.7 (N/μm) or more.

Item 10B. The battery packaging material according to any one of items 1B to 9B, wherein an acid resistance film layer is formed on the stainless steel foil on at least the heat-sealable resin layer side, and the acid resistance film layer contains a phosphorus compound in an amount of 100 mg or more in terms of phosphorus per 1 $m^2$ of surface area of the stainless steel foil 3.

Item 11B. A battery, wherein a battery element including at least a positive electrode, a negative electrode and an electrolyte is contained in a package formed of the battery packaging material according to any one of items 1B to 10B.

Advantages of the Invention

According to a first invention, there can be provided a battery packaging material including a laminate including at least a base material layer, a stainless steel foil and a heat-sealable resin layer in this order, wherein an acid resistance film layer is formed on the stainless steel foil on at least the heat-sealable resin layer side, the battery packaging material having high piercing strength and excellent electrolytic solution resistance and moldability.

Further, in a battery packaging material including an austenite-based stainless steel foil as a stainless steel foil, a battery packaging material provided with a specific acid resistance film layer, a battery packaging material which is black on the base material layer side, and a battery packaging material with an upper limit set to the melt flow rate (MFR) of a heat-sealable resin layer, an excellent effect is exhibited in piercing strength, moldability and electrolytic solution resistance. Further, deterioration of airtightness and reduction of sealing strength due to positional displacement of a heat-sealing surface, etc. after heat-sealing, which easily occurs when a stainless steel foil is used, can be effectively suppressed.

According to a second invention, there can be provided a battery packaging material including a laminate including at least a base material layer, a stainless steel foil and a heat-sealable resin layer in this order, wherein a first protective layer and a second protective layer each having an elastic modulus of 100 MPa or more are provided on both sides of the stainless steel foil, the battery packaging material having high piercing strength and excellent moldability.

EMBODIMENTS OF THE INVENTION

A battery packaging material according to a first invention is a battery packaging material including a laminate including at least a base material layer, a stainless steel foil and a heat-sealable resin layer in this order, wherein an acid resistance film layer is formed on the stainless steel foil on at least the heat-sealable resin layer side. Hereinafter, this invention will be referred to as a first embodiment of the first invention.

Further, the battery packaging material according to the first invention encompasses, in addition to the configuration in the first embodiment, a second embodiment in which a specific acid resistance film layer is provided on a surface of the stainless steel foil; a third embodiment in which the battery packaging material is colored black on the base material layer side; and a fourth embodiment in which an upper limit of the melt flow rate (MFR) of the heat-sealable resin layer is set to a specific value.

A battery packaging material according to a second invention includes a laminate including at least a stainless steel foil having a first surface and a second surface, a base material layer laminated on the first surface, and a heat-sealable resin layer laminated on the second surface, wherein at least one layer laminated on the first surface of the stainless steel foil forms a first protective layer having an elastic modulus of 100 MPa or more as measured by a method conforming to JIS K7127, and at least one layer laminated on the second surface of the stainless steel foil forms a second protective layer having an elastic modulus of 100 MPa or more as measured by a method conforming to JIS K7127.

Hereinafter, for the battery packaging material according to the first invention, the first embodiment will be first described in detail, and the second to fourth embodiments will be then described in detail for configurations that are added to the first embodiment. Next, the second invention will be described. For the second invention, descriptions of the same matters as in the first invention will be omitted.

First Embodiment

Figure 2:
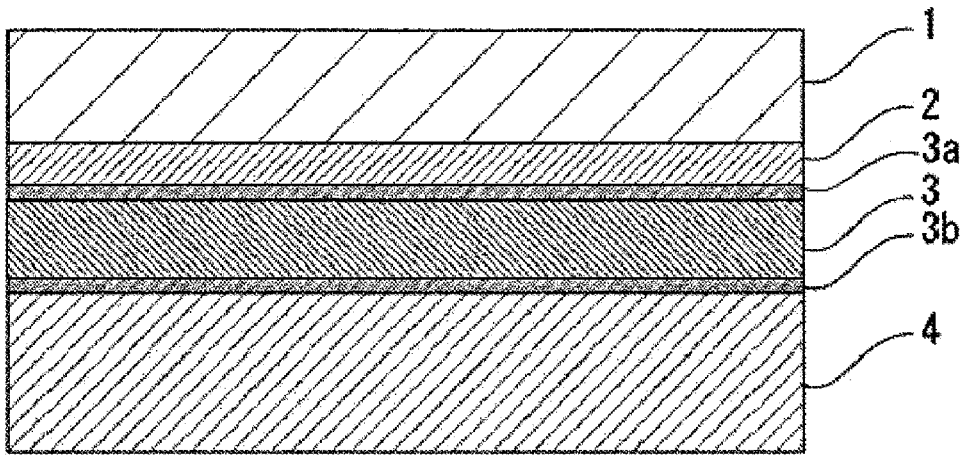
FIG. 2 is a schematic sectional view of the battery packaging material according to the first invention.
Figure 3:
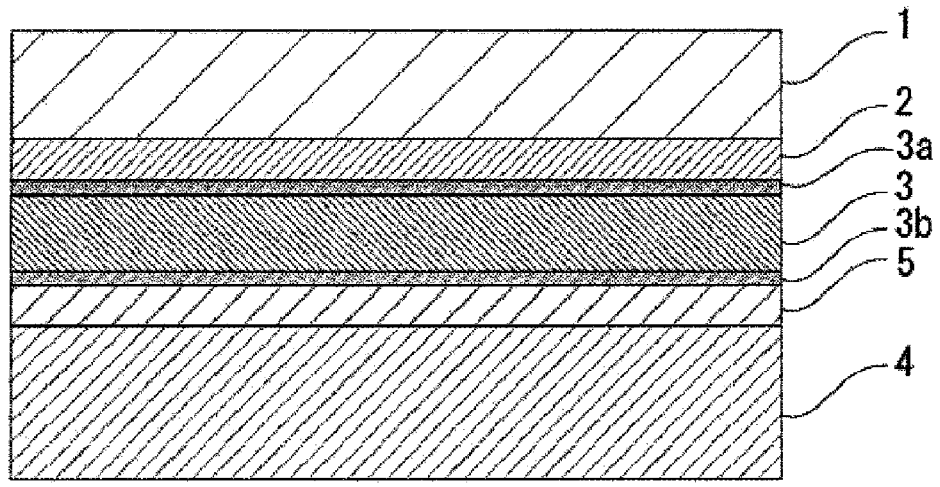
FIG. 3 is a schematic sectional view of the battery packaging material according to the first invention.

1. Laminated Structure of Battery Packaging Material According to First Invention The battery packaging material according to the first invention includes a laminate including at least a base material layer 1, a stainless steel foil 3, an acid resistance film layer 3b and a heat-sealable resin layer 4 in this order. When the battery packaging material is used in a battery, the base material layer 1 serves as an outermost layer, and the heat-sealable resin layer 4 serves as an innermost layer (battery element side). During construction of a battery, the heat-sealable resin layer 4 situated on the peripheral edge of a battery element is brought into contact with itself, and heat-welded to hermetically seal the battery element, so that the battery element is encapsulated. As shown in FIG. 2, the battery packaging material according to the first invention may include an adhesive agent layer 2 between the base material layer 1 and the stainless steel foil 3. As shown in FIG. 3, the battery packaging material according to the first invention may include an adhesive layer 5 between the stainless steel foil 3 and the heat-sealable resin layer 4.

Figure 1:
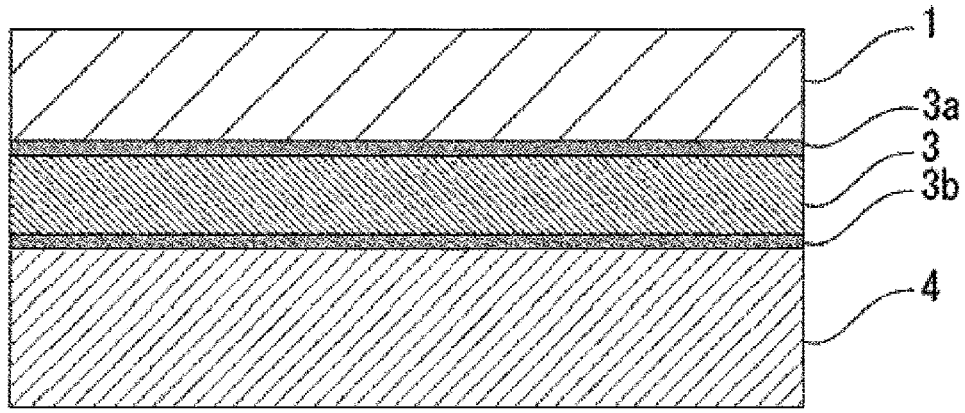
FIG. 1 is a schematic sectional view of a battery packaging material according to a first invention.

The battery packaging material according to the first invention may include an acid resistance film layer 3a on a surface of the stainless steel foil 3 on the base material layer 1 side. In FIGS. 1 to 3, the acid resistance film layer 3a is laminated on a surface of the stainless steel foil 3 on the base material layer 1 side, and the acid resistance film layer 3b is laminated on a surface of the stainless steel foil 3 on the heat-sealable resin layer 4 side.

2. Compositions of Layers Forming Battery Packaging Material of First Invention

[Base Material Layer 1]

In the battery packaging material according to the first invention, the base material layer 1 is a layer that forms the outermost layer. The material that forms the base material layer 1 is not particularly limited as long as it has an insulation quality. Examples of the material that forms the base material layer 1 include polyester resins, polyamide resins, epoxy resins, acrylic resins, fluororesins, polyurethane resins, silicone resins, phenol resins, polyether imide resins, polyimide resins, polyolefin resins and mixtures and copolymers thereof.

Specific examples of the polyester resin include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerization polyester including ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene(terephthalate/decane dicarboxylate). Specific examples of the copolymerization polyester with butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. A polyester has the advantage that it is excellent in electrolytic solution resistance, so that whitening etc. due to deposition of an electrolytic solution is hard to occur, and thus the polyester is suitably used as a material for formation of the base material layer 1.

Specific examples of the polyamide resin include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof. A stretched polyamide film is excellent in stretchability, can prevent occurrence of whitening due to resin breakage in the base material layer 1 during molding, and is thus suitably used as a material for formation of the base material layer 1.

The base material layer 1 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 1. The base material layer 1 may be formed by coating the top of the stainless steel foil 3 with the above-mentioned material.

Among them, nylons and polyesters are preferred, and biaxially stretched nylons and biaxially stretched polyesters are further preferred, with biaxially stretched nylons being especially preferred, as resin films for formation of the base material layer 1.

The base material layer 1 can also be laminated with at least one of a resin film and a coating which is made of a different material for improving pinhole resistance, and insulation quality as a package of a battery. Specific examples include a multilayer structure in which a polyester film and a nylon film are laminated, and a multilayer structure in which a biaxially stretched polyester and a biaxially stretched nylon are laminated. When the base material layer 1 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method. When the resin films are bonded with the use of an adhesive, the adhesive to be used may be a two-liquid curable adhesive, or may be a one-liquid curable adhesive. Further, the adhesion mechanism of the adhesive is not particularly limited, and may be any one of a chemical reaction type, a solvent volatilization type, a heat melting type, a heat pressing type, an electron beam curing type such as that of UV or EB, and so on. Examples of the component of the adhesive include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers, silicone-based resins and fluorine-based resins.

The friction of the base material layer 1 may be reduced for improving moldability. When the friction of the base material layer 1 is reduced, the friction coefficient of the surface thereof is not particularly limited, and it is, for example, 1.0 or less. Examples of the method for reducing the friction of the base material layer 1 include matting treatment, formation of a thin film layer of a slipping agent, and a combination thereof. A resin layer may be formed to reduce the friction. Examples of these resins include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers, silicone-based resins and fluorine-based resins.

In the base material layer 1, a crosslinking agent and a curing agent may be used in combination as necessary. By using these agents, not only the friction of the base material layer 1 can be reduced, but also the base material layer 1 can be made to function as a protective layer which ensures that resistance is retained at room temperature for 5 hours or more even if an electrolytic solution is deposited; a layer which makes it possible to easily determine the necessity of maintenance of a production apparatus by serving as a layer that is dissolved with an electrolytic solution to show deposition of the electrolytic solution; a layer which makes it possible to visually discriminate a heat-sealed portion when heat-sealing is performed; a layer which makes it easy to perform maintenance by eliminating a contact portion by peeling off when coming into contact with a production apparatus; and so on.

Examples of method of matting treatment include a method in which a matting agent is added to the base material layer 1 beforehand to form irregularities on the surface, a transfer method by heating or pressurization with an embossing roll, and a method in which the surface is mechanically roughened using dry or wet blasting, or a file. Examples of the outermost layer matting agent include fine particles having a particle size of about 0.5 nm or more and 5 μm or less. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acryl, crosslinked styrene, crosslinked polyethylene, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The thin film layer of a slipping agent can be formed by precipitating a slipping agent on the surface of the base material layer 1 by bleeding-out to form a thin layer, or depositing a slipping agent on the base material layer 1. The slipping agent is not particularly limited, and examples thereof include fatty acid amides such as erucic acid amide, stearic acid amide, behenic acid amide, ethylene bis-oleic acid amide and ethylene bis-stearic acid amide, metal soaps, hydrophilic silicone, acryl grafted with silicone, epoxy resins grafted with silicone, polyethers grafted with silicone, polyesters grafted with silicone, block silicone acryl copolymers, polyglycerol-modified silicone and paraffin. These slipping agents may be used alone, or may be used in combination of two or more thereof.

As described in detail in the third embodiment below, the base material layer 1 may be black for effectively dissipating heat from the stainless steel foil during heat-sealing of the battery packaging material. The method for coloring the base material layer 1 black is as described in the third embodiment below.

The thickness of the base material layer 1 is, for example, 3 µm or more and 75 µm or less, preferably 5 µm or more and 50 µm or less.

[Adhesive Agent Layer 2]

In the battery packaging material according to the first invention, the adhesive agent layer 2 is a layer provided as necessary for the purpose of improving adhesion between the base material layer 1 and the stainless steel foil 3. The base material layer 1 and the stainless steel foil 3 may be directly laminated.

The adhesive agent layer 2 is formed from an adhesive resin capable of bonding the base material layer 1 and the stainless steel foil 3. The adhesive resin used for forming the adhesive agent layer 2 may be a two-liquid curable adhesive resin, or may be a one-liquid curable adhesive resin. Further, the adhesion mechanism of the adhesive resin used for forming the adhesive agent layer 2 is not particularly limited, and may be any one of a chemical reaction type, a solvent volatilization type, a heat melting type, a heat pressing type and so on.

Specific examples of the resin component of the adhesive resin that can be used for forming the adhesive agent layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, acid-modified polyolefins and metal-modified polyolefins; polyvinyl acetate-based resins; cellulose-based adhesives; (meth)acryl-based resins; polyimide-based resins; amino resins such as urea resins and melamine resins; rubbers such as chloroprene rubber, nitrile rubber and styrene-butadiene rubber; silicone-based resins; and ethylene fluoride-propylene copolymers. These adhesive resin components may be used alone, or may be used in combination of two or more thereof. The combination form of two or more adhesive resin components is not particularly limited, and examples of the adhesive resin components include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among them, polyurethane-based two-liquid curable adhesive resins; and polyamides, polyesters or blend resins of these resins and modified polyolefins are preferred because they are excellent in spreadability, durability and yellowing inhibition action under high-humidity conditions, thermal degradation inhibition action during heat-sealing, and so on, and effectively suppress occurrence of delamination by inhibiting a reduction in lamination strength between the base material layer 1 and the stainless steel foil 3.

The adhesive agent layer 2 may be made multilayered with different adhesive resin components. When the adhesive agent layer 2 is made multilayered with different resin components, it is preferred that a resin excellent in adhesion with the base material layer 1 is selected as an adhesive resin component to be disposed on the base material layer 1 side, and an adhesive resin component excellent in adhesion with the stainless steel foil 3 is selected as an adhesive resin component to be disposed on the stainless steel foil 3 side for improving the lamination strength between the base material layer 1 and the stainless steel foil 3. When the adhesive resin layer 2 is made multilayered with different adhesive resin components, specific examples of the preferred adhesive resin component to be disposed on the stainless steel foil 3 side include acid-modified polyolefins, metal-modified polyolefins, mixed resins of polyesters and acid-modified polyolefins, and resins containing a copolymerization polyester.

As described in detail in the third embodiment below, it is desirable to effectively dissipate heat from the stainless steel foil during heat-sealing of the battery packaging material. Since the heat capacity per unit volume of stainless steel is larger by a factor of 2 to 3 than that of aluminum, the cooling rate of stainless steel after heat-sealing or heating treatment is low. The Young's modulus (spring constant) of stainless steel is larger by a factor of 2 to 3 than that of aluminum. Thus, as compared to aluminum, stainless steel is harder to cool, and has a larger force to return to its original shape. After the heat-sealable resin layer is heat-sealed, the resin in the sealed portion is hardly cooled, and further, the sealed portions of the heat-sealable resin layer are easily positionally displaced from each other by the force of the stainless steel foil to return to the shape before heat-sealing. When the sealing surface is positionally displaced during cooling, the shape of a so called "polymer sump" generated during sealing becomes uneven. Thus, when the internal pressure increases due to generation of a gas or elevation of a temperature after formation of a battery, leakage of a gas and contents from the uneven part may occur. The heat-sealable resin layer is cured while positional displacement occurs, and therefore stress is apt to remain in the heat-sealable resin layer. Accordingly, uniformity of sealing strength is deteriorated, and this may cause leakage of a gas and contents.

For the reason described above, it is important to perform cooling as quickly as possible after heat-sealing when a stainless steel foil is used. Cooling can be performed quickly using a method in which a cooling plate is brought into contact with the resin layer after heat-sealing, or a method in which air is blown by an air cooling nozzle after heat-sealing. It is also effective that a layer for enhancing the cooling effect is provided on the outer side from the stainless steel foil in the battery packaging material. In particular, as a method having a relatively high effect as a method for effectively dissipating heat from the stainless steel foil during heat-sealing of the battery packaging material, mention is made of a method in which the battery packaging material is colored black on the outer side from the stainless steel foil. Other methods include a method in which layers are configured so as to enhance the cooling effect. Mention is made of, for example, a method in which fine particles or porous fine particles of silica, alumina, carbon or the like that has a high heat dissipation effect, fibers such as carbon fibers, or a metal filler of aluminum, copper, nickel or the like are added to a layer on the outer side from the stainless steel foil.

Examples of the preferred configuration for effectively dissipating heat from the stainless steel foil 3 during heat-sealing of the battery packaging material include the following aspects.

(1) A black printing layer is provided on the outer surface of the base material layer 1 (surface on a side opposite to the stainless steel foil 3). In this aspect, a black printing layer is provided on the outer surface of the base material layer 1 using an ink containing a black colorant as described later.

(2) The base material layer 1 is colored black. In this aspect, the base material layer 1 is colored black by including the later-described black colorant in a resin that forms the base material layer.

(3) A black printing layer is provided on the inner surface of the base material layer 1 (surface on the stainless steel foil 3 side). In this aspect, a black printing layer is provided on the inner surface of the base material layer 1 using an ink containing a black colorant as described later.

(4) The adhesive agent layer 2 is colored black. In this aspect, the adhesive agent layer 2 is colored black by including the later-described black colorant in a resin that forms the adhesive agent layer 2.

(5) A black colored layer is provided between the adhesive agent layer 2 and the stainless steel foil. In this aspect, a black colored layer is provided on a surface of the stainless steel foil 3 on the adhesive agent layer 2 side using a resin containing the later-described black colorant.

Examples of the black colorant include carbon-based black pigments such as carbon black; oxide-based black pigments such as iron oxides (e.g. magnetite-type triiron tetraoxide), composite oxides including copper and chromium, composites including copper, chromium and zinc, and titanium-based oxides; and black dyes. For further enhancing the effect, for example, a method including adding fine particles or porous fine particles of silica, alumina, barium or the like, or a metal filler of aluminum, copper, nickel or the like may be employed. When a colored layer is formed on the outer surface, the friction can be reduced as described above, and various functions can be imparted.

The thickness of the adhesive agent layer 2 is, for example, 0.5 µm or more and 50 µm or less, preferably 2 µm or more and 25 µm or less.

[Stainless Steel Foil 3]

In the battery packaging material according to the first invention, the stainless steel foil 3 is a layer which is intended to improve the strength of the battery packaging material, and also functions as a barrier layer for preventing ingress of water vapor, oxygen, light and the like into the battery.

In the first invention, it is preferable that the stainless steel foil 3 is formed of austenite-based stainless steel. Accordingly, a battery packaging material having further high piercing strength and excellent electrolytic solution resistance and moldability is obtained.

Specific examples of the austenite-based stainless steel that forms the stainless steel foil 3 include SUS 304 stainless steel, SUS 301 stainless steel and SUS 316L stainless steel, and among them, SUS 304 stainless steel is especially preferable for obtaining a battery packaging material having high piercing strength and excellent electrolytic solution resistance and moldability.

The thickness of the stainless steel foil 3 is not particularly limited, but it is preferably 40 µm or less, more preferably about 10 µm or more and 30 µm or less, still more preferably about 15 µm or more and 25 µm or less for obtaining a battery packaging material having high piercing strength and excellent electrolytic solution resistance and moldability while having a further reduced thickness.

Particularly, when the stainless steel foil is subjected to a cold rolling treatment, its extensibility is improved, leading to improvement of moldability. Further, when the stainless steel foil is heat-treated to be annealed after being subjected to cold rolling, the balance of a machine direction and a traverse direction is improved, leading to improvement of moldability. It is important to carry out a surface cleaning step after the rolling treatment or heat treatment for stabilizing the effect of a chemical conversion treatment as described later. Examples of the cleaning method include washing with an alkali or acid, and alkali electrolytic degreasing cleaning. It is also possible to perform an ultrasonic treatment, a plasma treatment or the like concurrently with the above-mentioned cleaning method. Alkali degreasing cleaning or alkali electrolytic degreasing is preferable. Accordingly, wettability of the surface is improved, so that the chemical conversion treatment can be uniformly performed, leading to stabilization of content resistance property. For wettability, the contact angle with water is preferably 50° or less, more preferably 30° or less, still more preferably 15° or less.

[Acid Resistance Film Layers 3a and 3b]

In the battery packaging material according to the first invention, an acid resistance film layer is formed on the stainless steel foil 3 on at least the heat-sealable resin layer 4 side. Accordingly, a battery packaging material having high piercing strength and excellent electrolytic solution resistance and moldability is obtained.

In the first invention, the battery packaging material may further include an acid resistance film layer on a surface of the stainless steel foil 3 on the base material layer 1 side as necessary for stabilization of bonding between the stainless steel foil and a layer adjacent thereto, prevention of dissolution and corrosion, and so on. In the first invention, it is more preferable that an acid resistance film layer is laminated on both surfaces of the stainless steel foil. In FIGS. 1 to 3, the acid resistance film layer 3a is laminated on a surface of the stainless steel foil 3 on the base material layer 1 side, and the acid resistance film layer 3b is laminated on a surface of the stainless steel foil 3 on the heat-sealable resin layer 4 side as described above.

Here, the acid resistance film layer is specifically a layer with an acid resistance film formed on a surface of the stainless steel foil 3. Examples of the chemical conversion treatment for forming the acid resistance film layer include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a phosphoric acid chromate treatment using a combination of the chromic acid compound, the phosphoric acid compound and a phenol resin. Examples of the phenol resin include aminated phenol polymers including repeating units represented by the following general formulae (1) to (4). In the aminated phenol polymer, the repeating units represented by the following general formulae (1) to (4) may be contained alone, or may be contained in combination of two or more thereof.

[Chemical Formula 1]

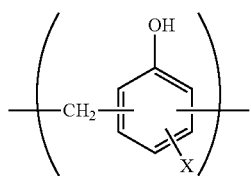

(1)

[Chemical Formula 2]

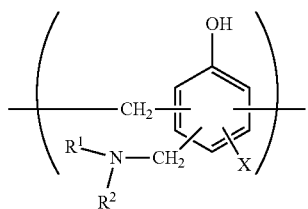

(2)

[Chemical Formula 3]

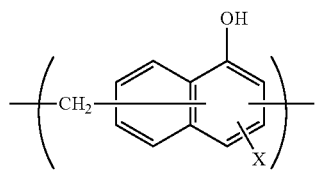

(3)

[Chemical Formula 4]

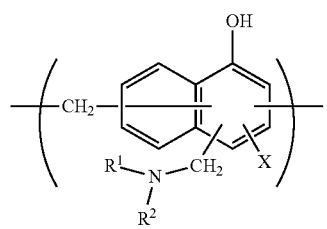

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with 1 to 4 carbon atoms, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 or more and about 1000000 or less, preferably about 1000 or more and about 20000 or less.

Examples of the chemical conversion treatment method for imparting corrosion resistance to the stainless steel foil 3 include a method in which a surface of the stainless steel foil 3 is coated with a dispersion of fine particles of a metal oxide such as aluminum oxide (alumina treatment), titanium oxide, cerium oxide (cerium treatment) or tin oxide or barium sulfate in phosphoric acid, or triazine thiol, and baked at 150° C. or higher to form a corrosion resistance treatment layer on the surface of the metal foil. Here, the dispersion or triazine thiol may also be included in a phenol resin, an epoxy resin, a polyurethane resins, a polyester resin, a fluororesin or the like, and formed into a layer. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

These chemical conversion treatments may be performed alone, or may be performed in combination of two or more thereof. The chemical conversion treatments may be performed using one compound alone, or may be performed using two or more compounds in combination.

The acid resistance film layer is preferably one formed by a chromic acid chromate treatment or a phosphoric acid chromate treatment among the treatments described above. The acid resistance film layer is especially preferably one formed by a phosphoric acid chromate treatment using the chromic acid compound, the phosphoric acid compound and a phenol resin (preferably the aminated phenol polymer) in combination as described in detail in a second embodiment below. The stainless steel foil has a passive film formed on a surface thereof. Thus, when a chemical conversion treatment is performed, it is necessary to form a mixed layer of chromium and a metal after activating or removing a part of the passive film by acid treatment. In a general hexavalent chromic acid treatment, it is necessary to increase the concentration of chromic acid, leading to an increase in load on the environment. In the phosphoric acid chromate treatment, the need can be satisfied by increasing the concentration of phosphoric acid, and the load on the environment can be reduced as compared to the hexavalent chromic acid treatment. By the above-mentioned combination, a phenol resin layer is formed on a chemical conversion treatment layer on a surface of the stainless steel foil. Formation of the resin layer increases the electric resistance of the surface. Thus, when a battery is formed, internal insulation quality is improved, so that corrosion due to a short-circuit and deposition of foreign matters, and leakage of contents due to corrosion hardly occur.

The amount of components contained the acid resistance film (chemical conversion treatment layer) to be formed on the surface of the stainless steel foil 3 in the chemical conversion treatment is not particularly limited, but for example when a chromate treatment is performed using a chromic acid compound, a phosphoric acid compound and the aminated phenol polymer in combination, it is desirable that the chromic acid compound be contained in an amount of about 0.5 mg or more and about 50 mg or less, preferably about 1.0 mg or more and about 40 mg or less, in terms of chromium, the phosphorus compound be contained in an amount of about 0.5 mg or more and about 500 mg or less, preferably about 1.0 mg or more and about 400 mg or less, in terms of phosphorus, and the aminated phenol polymer be contained in an amount of about 1 mg or more and about 200 mg or less, preferably about 5.0 mg or more and about 150 mg or less, per 1 $m^2$ of the surface of the stainless steel foil 3. Preferably, the acid resistance film layer contains the phosphorus compound in an amount of 100 mg or more in terms of phosphorus for ensuring that the battery packaging material including the stainless steel foil 3 has particularly excellent electrolytic solution resistance. Particularly, it is desirable that the chromic acid compound be contained in an amount of about 0.5 mg or more and about 50 mg or less in terms of chromium, the phosphorus compound be contained in an amount of 100 mg or more, especially preferably about 100 mg or more and about 400 mg or less, in terms of phosphorus, and the aminated phenol polymer be contained in an amount of about 1 mg or more and about 200 mg or less, per 1 $m^2$ of the surface of the metal layer 3.

The chemical conversion treatment is performed in the following manner: a solution containing a compound to be used for formation of an acid resistance film is applied to the surface of the stainless steel foil 3 by a bar coating method, a roll coating method, a gravure coating method, an immersion method or the like, and heating is then performed so that the temperature of the stainless steel foil 3 is about 70° C. or more and 300° C. or less. The stainless steel foil 3 may be subjected to a degreasing treatment by an alkali immersion method, an electrolytic cleaning method, an acid cleaning method, an electrolytic acid cleaning method or the like before the stainless steel foil 3 is subjected to a chemical conversion treatment. When a degreasing treatment is performed as described above, the passive layer on the surface of the stainless steel foil 3 can be activated or removed, so that a chemical conversion treatment can be further efficiently performed.

[Heat-Sealable Resin Layer 4]

In the battery packaging material according to the first invention, the heat-sealable resin layer 4 corresponds to the innermost layer, and during construction of a battery, the heat-sealable resin layer 4 is heat-welded to itself to hermetically seal the battery element. The heat-sealable resin layer 4 may be formed of a plurality of layers.

When an adhesive layer 5 as described later is absent, the heat-sealable resin layer 4 is formed of a resin which allows the heat-sealable resin layer 4 to be bonded to the acid resistance film layer on the stainless steel foil 3 and allows the heat-sealable resin layer 4 to be heat-welded with itself. When the later-described adhesive layer 5 is present, the heat-sealable resin layer 4 is formed of a resin which allows the heat-sealable resin layer 4 to be bonded to the adhesive layer 5 and allows the heat-sealable resin layer 4 to be heat-welded with itself. The resin that forms the heat-sealable resin layer 4 is not particularly limited as long as it has the above-mentioned properties, and examples thereof include acid-modified polyolefins, polyester resins and fluorine-based resins. When the later-described adhesive layer 5 is present, resins including a resin that forms the adhesive layer, and also a polyolefin resin and a resin that forms the heat-sealable resin layer 4 may be used alone, or may be used in combination of two or more thereof.

The acid-modified polyolefin to be used for formation of the heat-sealable resin layer 4 is a polymer with the polyolefin modified by, for example, subjecting the polyolefin to graft polymerization with an unsaturated carboxylic acid. Specific examples of the polyolefin to be acid-modified include polyethylenes such as low-density polyethylene, medium-density polyethylene, high-density polyethylene and linear low-density polyethylene; crystalline or noncrystalline polypropylene such as homopolypropylene, block copolymers of polypropylene (e.g., block copolymers of propylene and ethylene) and random copolymers of polypropylene (e.g., random copolymers of propylene and ethylene); terpolymers of ethylene-butene-propylene; and the like. Among these polyolefins, polyolefins having at least propylene as a constituent monomer are preferred, and terpolymers of ethylene-butene-propylene and random copolymers of propylene-ethylene are further preferred from the viewpoint of heat resistance. Examples of the unsaturated carboxylic acid to be used for modification include maleic acid, acrylic acid, itaconic acid, crotonic acid, maleic anhydride and itaconic anhydride. Among these unsaturated carboxylic acids, maleic acid and maleic anhydride are preferred. These acid-modified polyolefins may be used alone, or may be used in combination of two or more thereof.

Specific examples of the polyester resin to be used for formation of the heat-sealable resin layer 4 include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerization polyester including ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyldicarboxylate) and polyethylene(terephthalate/decane dicarboxylate). Specific examples of the copolymerization polyester with butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyester resins may be used alone, or may be used in combination of two or more thereof.

Specific examples of the fluorine-based resin to be used for formation of the heat-sealable resin layer 4 include tetrafluoroethylene, trifluoroethylene, polyvinylidene fluoride, polyvinyl fluoride, ethylene tetrafluoroethylene, polychlorotrifluoroethylene, ethylene chlorotrifluoroethylene copolymers, tetrafluoroethylene-hexafluoropropylene copolymers and fluorine-based polyols. These fluorine-based resins may be used alone, or may be used in combination of two or more thereof.

When the adhesive layer 5 is absent, the heat-sealable resin layer 4 may be formed of only an acid-modified polyolefin, a polyester resin or a fluorine-based resin, or may contain a resin component other than the foregoing resin as necessary. When a resin component other than an acid-modified polyolefin, a polyester resin or a fluorine-based resin is included in the heat-sealable resin layer 4, the content of the acid-modified polyolefin, the polyester resin or the fluorine-based resin in the heat-sealable resin layer 4 is, for example, 10% by mass or more and 95% by mass or less, preferably 30% by mass or more and 90% by mass or less, more preferably 50% by mass or more and 80% by mass or less while it is not particularly limited as long as the effect of the first invention is not hindered.

Examples of the resin component that can be included as necessary in addition to an acid-modified polyolefin, a polyester resin or a fluorine-based resin in the heat-sealable resin layer 4 include polyolefins.

The polyolefin may have an acyclic or cyclic structure. Specific examples of the acyclic polyolefin include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. These polyolefins may be used alone, or may be used in combination of two or more thereof.

Among these polyolefins, those having properties as an elastomer (i.e. polyolefin-based elastomers), particularly propylene-based elastomers are preferred for improvement of the adhesive strength after heat-sealing, prevention of interlayer delamination after heat-sealing, and so on. Examples of the propylene-based elastomer include polymers containing, as constituent monomers, propylene and one or more α-olefins with a carbon number of 2 to 20 (excluding propylene), and specific examples of the α-olefin with a carbon number of 2 to 20 (excluding propylene), which forms the propylene-based elastomer, include ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. These ethylene-based elastomers may be used alone, or may be used in combination of two or more thereof.

When a resin component other than an acid-modified polyolefin, a polyester resin or a fluorine-based resin is included in the heat-sealable resin layer 4, the content of the resin component is appropriately set within the range of not hindering the purpose of the first invention. For example, when the heat-sealable resin layer 4 contains a propylene-based elastomer or styrene-based elastomer, the content of the propylene-based elastomer or styrene-based elastomer in the heat-sealable resin layer 4 is normally 5% by mass or more and 70% by mass or less, preferably 10% by mass or more and 60% by mass or less, more preferably 20% by mass or more and 50% by mass or less.

When the later-described adhesive layer 5 is present between the stainless steel foil 3 and the heat-sealable resin layer 4, examples of the resin that forms the heat-sealable resin layer 4 include polyolefins and modified cyclic polyolefins in addition to the above-mentioned acid-modified polyolefin, polyester resin and fluorine-based resin. These resins may be used alone, or may be used in combination of two or more thereof.

When the adhesive layer 5 is present, examples of the polyolefin that forms the heat-sealable resin layer 4 include those shown above as an example. The modified cyclic polyolefin is a polymer obtained by a graft-polymerizing a cyclic polyolefin with an unsaturated carboxylic acid. The cyclic polyolefin to be acid-modified is a copolymer of an olefin and a cyclic monomer. Examples of the olefin include ethylene, propylene, 4-methyl-1-pentene, styrene, butadiene and isoprene. Examples of the cyclic monomer include cyclic alkenes such as norbornene, specifically cyclic dienes such as cyclopentadiene, dicyclopentadiene, cyclohexadiene and norbornadiene. Examples of the unsaturated carboxylic acid to be used for modification include maleic acid, acrylic acid, itaconic acid, crotonic acid, maleic anhydride and itaconic anhydride. Among these unsaturated carboxylic acids, maleic acid and maleic anhydride are preferred. These modified cyclic polyolefins may be used alone, or may be used in combination of two or more thereof.

When the adhesive layer 5 is present, the heat-sealable resin layer 4 may be formed of only an acid-modified polyolefin, a polyester resin, a fluorine-based resin, a polyolefin or a modified cyclic polyolefin, or may contain a resin component other than the foregoing resin as necessary. When the heat-sealable resin layer 4 contains resin components other than the above-mentioned components, the content of these resins in the heat-sealable resin layer 4 is, for example, 10% by mass or more and 95% by mass or less, preferably 30% by mass or more and 90% by mass or less, more preferably 50% by mass or more and 80% by mass or less while it is not particularly limited as long as the effect of the first invention is not hindered. Examples of the resin component that can be included as necessary include those having properties as an elastomer as described above. The content of the resin component that can be included as necessary is appropriately set within the range of not hindering the purpose of the first invention. For example, when the heat-sealable resin layer 4 contains a propylene-based elastomer or styrene-based elastomer, the content of the propylene-based elastomer or styrene-based elastomer in the heat-sealable resin layer 4 is normally 5% by mass or more and 70% by mass or less, preferably 10% by mass or more and 60% by mass or less, more preferably 20% by mass or more and 50% by mass or less.

For effectively suppressing positional displacement of a heat-sealed surface, etc. after heat-sealing of the battery packaging material according to the first invention, the melting point $T_{m1}$ of the heat-sealable resin layer 4 is preferably 90° C. or more and 245° C. or less, more preferably 100° C. or more and 220° C. or less. The softening point $T_{s1}$ of the heat-sealable resin layer 4 is preferably 70° C. or more and 180° C. or less, more preferably 80° C. or more and 150° C. or less for the same reason as described above. The melt flow rate (MFR) of the heat-sealable resin layer 4 at 230° C. is preferably about 1 g/10 minutes or more and 25 g/10 minutes or less, more preferably 2 g/10 minutes or more and 15 g/10 minutes or less for the same reason as described above.

Here, the melting point $T_{m1}$ of the heat-sealable resin layer 4 is a value obtained by measuring the melting point of a resin component, which forms the heat-sealable resin layer 4, by a DSC method in accordance with JIS K6921-2 (ISO1873-2.2:95). When the heat-sealable resin layer 4 is formed of a blend resin containing a plurality of resin components, the melting point $T_{m1}$ thereof can be calculated by determining melting points of the respective resins in the manner described above, and calculating a weighed average of the determined melting points based on a mass ratio.

The softening point $T_{s1}$ of the heat-sealable resin layer 4 is a value obtained by performing measurement using a thermo-mechanical analyzer (TMA). When the heat-sealable resin layer 4 is formed of a blend resin containing a plurality of resin components, the softening point $T_{s1}$ thereof can be calculated by determining softening points of the respective resins in the manner described above, and calculating a weighed average of the determined softening points based on a mass ratio.

The melt flow rate of the heat-sealable resin layer 4 is a value obtained by performing measurement using a melt flow measurement device in accordance with JIS K7210.

The thickness of the heat-sealable resin layer 4 is, for example, 10 μm or more and 120 μm or less, preferably 10 μm or more and 80 μm or less, more preferably 20 μm or more and 60 μm or less.

The heat-sealable resin layer 4 may be a single layer, or may have multiple layers. The heat-sealable resin layer 4 may contain a slipping agent etc. as necessary. When the heat-sealable resin layer 4 contains a slipping agent, moldability of the battery packaging material can be improved. Further, in the first invention, when the heat-sealable resin layer 4 contains a slipping agent, not only moldability but also insulation quality of the battery packaging material can be improved. The detailed mechanism in which the insulation quality of the battery packaging material is improved when the heat-sealable resin layer 4 contains a slipping agent is not necessarily evident, but may be considered as follows. That is, when the heat-sealable resin layer 4 contains a slipping agent, the molecular chain of the resin is easily moved in the heat-sealable resin layer 4 at the time of application of an external force to the heat-sealable resin layer 4, so that cracks are hardly generated. Particularly, when the heat-sealable resin layer 4 is formed of a plurality of kinds of resins, cracks are easily generated at interfaces existing between these resins, but when a slipping agent exists on the interfaces, the resin is easily moved at the interface, so that generation of cracks at the time of application of an external force can be effectively suppressed. Through this mechanism, deterioration of insulation quality due to generation of cracks in the heat-sealable resin layer may be suppressed.

The slipping agent is not particularly limited, a known slipping agent may be used, and examples thereof include those shown above as an example for the base material layer 1. The slipping agents may be used alone, or may be used in combination of two or more thereof. The content of the slipping agent in the heat-sealable resin layer 4 is not particularly limited, and is preferably about 0.01% by mass or more and 0.2% by mass or less, more preferably about 0.05% by mass or more and 0.15% by mass or less for improving the moldability and insulation quality of the battery packaging material.

[Adhesive Layer 5]

In the battery packaging material of the first invention, the adhesive layer 5 may be further provided between the stainless steel foil 3 and the heat-sealable resin layer 4 as shown in FIG. 3 for the purpose of, for example, firmly bonding the stainless steel foil 3 and the heat-sealable resin layer 4. The adhesive layer 5 may be formed of one layer, or may be formed of a plurality of layers.

The adhesive layer 5 is formed from a resin capable of bonding the stainless steel foil 3 and the heat-sealable resin layer 4. The resin that forms the adhesive layer 5 is not particularly limited as long as it is capable of bonding the stainless steel foil 3 and the heat-sealable resin layer 4, and examples of the preferred resin include the above-mentioned acid-modified polyolefin, polyester resins, fluorine-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers and silicone-based resins. The resins that form the adhesive layer 5 may be used alone, or may be used in combination of two or more thereof.

The adhesive layer 5 may be formed of only at least one of these resins, or may contain a resin component other than these resins as necessary. When a resin component other than these resins is included in the adhesive layer 5, the content of the acid-modified polyolefin, polyester resin, fluorine-based resin, polyether-based resin, polyurethane-based resin, epoxy-based resin, phenol resin-based resin, polyamide-based resin, polyolefin-based resin, polyvinyl acetate-based resin, cellulose-based resin, (meth)acryl-based resin, polyimide-based resin, amino resin, rubber and silicone-based resin in the adhesive layer 5 is, for example, 10% by mass or more and 95% by mass or less, preferably 30% by mass or more and 90% by mass or less, more preferably 50% by mass or more and 80% by mass or less while it is not particularly limited as long as the effect of the first invention is not hindered.

Preferably, the adhesive layer 5 further contains a curing agent. When the adhesive layer 5 contains a curing agent, the mechanical strength of the adhesive layer 5 is increased, so that the insulation quality of the battery packaging material can be effectively improved. The curing agents may be used alone, or may be used in combination of two or more thereof.

The curing agent is not particularly limited as long as it cures an acid-modified polyolefin, a polyester resin, a fluorine-based resin, a polyether-based resin, a polyurethane-based resin, an epoxy-based resin, a phenol resin-based resin, a polyamide-based resin, a polyolefin-based resin, a polyvinyl acetate-based resin, a cellulose-based resin, a (meth)acryl-based resin, a polyimide-based resin, an amino resin, a rubber or a silicone-based resin. Examples of the curing agent include polyfunctional isocyanate compounds, carbodiimide compounds, epoxy compounds and oxazoline compounds.

The polyfunctional isocyanate compound is not particularly limited as long as it is a compound having two or more isocyanate groups. Specific examples of the polyfunctional isocyanate compound include isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers.

The carbodiimide compound is not particularly limited as long as it is a compound having at least one carbodiimide group (—N═C═N—). The carbodiimide compound is preferably a polycarbodiimide compound having at least two carbodiimide groups. Specific examples of the particularly preferred carbodiimide compound include polycarbodiimide compounds having a repeating unit represented by the following general formula (5):

[Chemical Formula 5]

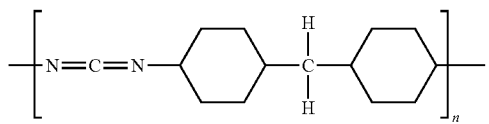

(5)

[in the general formula (5), n is an integer of 2 or larger]; polycarbodiimide compounds having a repeating unit represented by the following general formula (6):

[Chemical Formula 6]

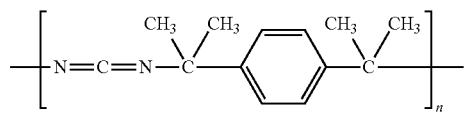

(6)

[in the general formula (6), n is an integer of 2 or larger]; polycarbodiimide compounds represented by the following general formula (7):

[Chemical Formula 7]

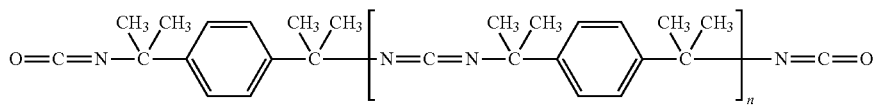

(7)

[in the general formula (7), n is an integer of 2 or larger].

In the general formulae (4) to (7), n is normally an integer of 30 or smaller, preferably an integer of 3 to 20.

The epoxy compound is not particularly limited as long as it is a compound having at least one epoxy group. Examples of the epoxy compound include epoxy resins such as bisphenol A diglycidyl ether, modified bisphenol A diglycidyl ether, novolak glycidyl ether, glycerin polyglycidyl ether and polyglycerin polyglycidyl ether.

The oxazoline compound is not particularly limited as long as it is a compound having an oxazoline backbone. Specific examples of the oxazoline compound include EPOCROS Series from Nippon Shokubai Co., Ltd.

The curing agent may be formed of two or more compounds for increasing the mechanical strength of the adhesive layer 5, etc.

In the adhesive layer 5, the content of the curing agent is preferably in a range of 0.1 parts by mass or more and 50 parts by mass or less, more preferably in a range of 0.1 parts by mass or more and 30 parts by mass or less based on 100 parts by mass of the acid-modified polyolefin, polyester resin, fluorine-based resin, polyether-based resin, polyurethane-based resin, epoxy-based resin, phenol resin-based resin, polyamide-based resin, polyolefin-based resin, polyvinyl acetate-based resin, cellulose-based resin, (meth)acryl-based resin, polyimide-based resin, amino resin, rubber or silicon-based resin. In the adhesive layer 5, the content of the curing agent is preferably in a range of 1 equivalent or more and 30 equivalents or less, more preferably in a range of 1 equivalent or more and 20 equivalents or less in terms of a reactive group in the curing agent based on 1 equivalent of carboxyl groups in the resins such as an acid-modified polyolefin resin. Accordingly, the insulation quality and durability of the battery packaging material can be improved.

When the adhesive layer 5 contains a curing agent, the adhesive layer 5 may be formed of a two-liquid curable adhesive resin, or may be formed of a one-liquid curable adhesive resin. Further, the adhesion mechanism of the adhesive is not particularly limited, and may be any one of a chemical reaction type, a solvent volatilization type, a heat melting type, a heat pressing type, an electron beam curing type such as that of UV or EB, and so on.

The melting point $T_{m2}$ of the adhesive layer 5 is preferably 90° C. or more and 245° C. or less, more preferably 100° C. or more and 230° C. or less. The softening point $T_{s2}$ of the adhesive layer 5 is preferably 70° C. or more and 180° C. or less, more preferably 80° C. or more and 150° C. or less for the same reason as described above.

The method for calculating the melting point $T_{m2}$ and softening point $T_{s2}$ of the adhesive layer 5 is the same as the method for calculating the melting point and softening point of the heat-sealable resin layer 4.

The thickness of the adhesive layer 5 is not particularly limited, but is preferably 0.01 μm or more, more preferably 0.05 μm or more and 20 μm or less. When the thickness of the adhesive layer 5 is less than 0.01 μm, it may be difficult to stably bond stainless steel foil 3 and the heat-sealable resin layer 4 to each other.

In the battery packaging material according to the present invention, the total thickness of the laminate including the layers described above is not particularly limited, but it is preferably 110 μm or less, more preferably about 42 μm or more and 85 μm or less, still more preferably about 45 μm or more and 70 μm or less for reducing the thickness of the battery packaging material, and favorably exhibiting high piercing strength and excellent electrolytic solution resistance and moldability.

In the battery packaging material according to the first invention, the piercing strength of the laminate as measured by a measurement method conforming to JIS Z 1707 1997 is preferably 18 N or more, more preferably 20 N or more.

Further, it is preferable that where T is a total thickness (μm) of the laminate, TS is a thickness (μm) of the stainless steel foil, and F is a piercing strength (N) of the laminate as measured by a measurement method conforming to JIS Z 1707 1997, F/T is 0.3 (N/μm) or more, and F/TS is 0.7 (N/μm) or more for reducing the thickness of the battery packaging material, and favorably exhibiting high piercing strength and excellent electrolytic solution resistance and moldability.

3. Method for Producing Battery Packaging Material According to First Invention

While the method for producing the battery packaging material according to the first invention is not particularly limited as long as a laminate in which layers each having a predetermined composition are laminated is obtained, for example the following method is shown as an example.

First, a laminate with the base material layer 1, the adhesive agent layer 2 as necessary, and the stainless steel foil 3 laminated in this order (hereinafter, the laminate may be described as a "laminate A") is formed. Specifically, the laminate A, when it has the adhesive agent layer 2, is formed by laminating the base material layer 1, the adhesive agent layer 2, and the stainless steel foil 3 with the surface subjected to a chemical conversion treatment using a thermal lamination method, a sand lamination method, a dry lamination method, a melt extrusion method, a co-extrusion method, a combination thereof or the like. By performing an aging treatment, a hydration treatment, a heating treatment, an electron beam treatment, an ultraviolet treatment or the like in formation of the laminate A, stability of bonding of the base material layer 1 and the stainless steel foil 3 by the adhesive agent layer 2 can be improved. Examples of the method for forming the laminate A by laminating the base material layer 1 directly on the stainless steel foil 3 include methods in which lamination is performed using a thermal lamination method, a solution coating method, a melt extrusion method, a co-extrusion method, a combination thereof, or the like. Here, by performing an aging treatment, a hydration treatment, a heating treatment, an electron beam treatment, an ultraviolet treatment or the like, stability of bonding of the base material layer 1 and the stainless steel foil 3 can be improved.

For example, formation of the laminate A by a dry lamination method can be performed in the following manner: a resin that forms the adhesive agent layer 2 is dissolved or dispersed in water or an organic solvent, the top of the base material layer 1 is coated with the resulting solution or dispersion, water or the organic solvent is dried to form the adhesive agent layer 2 on the base material layer 1, and the stainless steel foil 3 is then heated and press-bonded.

For example, formation of the laminate A by a thermal lamination method can be performed in the following manner: a multilayer film in which the base material layer 1 and the adhesive agent layer 2 are laminated is provided beforehand, and thermal press-bonding is performed using a heating roll while the adhesive agent layer 2 is held between the base material layer 1 and the stainless steel foil 3. Formation of the laminate A by a thermal lamination method may also be performed in the following manner: a multilayer film in which the stainless steel foil 3 and the adhesive agent layer 2 are laminated is provided beforehand, the base material layer 1 is superimposed on the heated stainless steel foil 3 and adhesive agent layer 2, and thermal press-bonding is performed while the adhesive agent layer 2 is held between the base material layer 1 and the stainless steel foil 3.

The multilayer film which is provided beforehand in the thermal lamination method and in which the base material layer 1 and the adhesive agent layer 2 are laminated is formed in the following manner: an adhesive that forms the adhesive agent layer 2 is laminated by melt extrusion or solution coating (liquid coating) on a resin film that forms the base material layer 1, and dried, and baking is then performed at a temperature equal to or higher than the melting point of the adhesive that forms the adhesive agent layer 2. By performing baking, adhesive strength between the stainless steel foil 3 and the adhesive agent layer 2 is increased. The multilayer film which is provided beforehand in the thermal lamination method and in which the stainless steel foil 3 and the adhesive agent layer 2 are laminated is similarly formed in the following manner: an adhesive that forms the adhesive agent layer 2 is laminated by melt extrusion or solution coating on a metal foil that forms the stainless steel foil 3, and dried, and baking is then performed at a temperature equal to or higher than the melting point of the adhesive that forms the adhesive agent layer 2.

For example, formation of the laminate A by a sand lamination method can be performed in the following manner: an adhesive that forms the adhesive agent layer 2 is melt-extruded onto the upper surface of the stainless steel foil 3, so that a resin film that forms the base material layer 1 is bonded to the stainless steel foil. Here, it is desirable that the resin film be bonded to perform temporary bonding, and then heated again to perform main bonding. In the sand lamination method, the adhesive agent layer 2 may be made multilayered with different types of resins. In this case, the laminate should be formed in the following manner: a multilayer film in which the base material layer 1 and the adhesive agent layer 2 are laminated is provided beforehand, and an adhesive that forms the adhesive agent layer 2 is melt-extruded onto the upper surface of the stainless steel foil 3, and laminated to the multilayer resin film by a thermal lamination method. Accordingly, the adhesive agent layer 2 that forms the multilayer film and the adhesive agent layer 2 laminated on the upper surface of the stainless steel foil 3 are bonded together to form the two-layer adhesive agent layer 2. When the adhesive agent layer 2 is made multilayered with different types of resins, the laminate may be formed in the following manner: a multilayer film in which the stainless steel foil 3 and the adhesive agent layer 2 are laminated is provided beforehand, an adhesive that forms the adhesive agent layer 2 is melt-extruded onto the base material layer 1, and this is laminated to the adhesive agent layer 2 on the stainless steel foil 3. Accordingly, the adhesive agent layer 2 formed of two different adhesives is formed between the multilayer resin film and the base material layer 1.

Then, the heat-sealable resin layer 4 is laminated on the stainless steel foil 3 of the laminate A. The heat-sealable resin layer 4 can be laminated on the stainless steel foil 3 of the laminate A by a co-extrusion method, a thermal lamination method, a sand lamination method, a coating method, a combination thereof or the like. For example, when the adhesive layer 5 is not provided, the heat-sealable resin layer 4 can be formed on the stainless steel foil 3 using a melt extrusion method, a thermal lamination method, a coating method or the like. When the adhesive layer 5 is provided, the adhesive layer 5 can be formed on the stainless steel foil 3 using a melt extrusion method, a thermal lamination method, a coating method or the like, followed by formation of the heat-sealable resin layer 4 by a similar method. A co-extrusion method may be carried out in which the adhesive layer 5 and the heat-sealable resin layer 4 are simultaneously melt-extruded onto the stainless steel foil 3. A sand lamination method may also be carried out in which the adhesive layer 5 is melt-extruded onto the stainless steel foil 3, and the film-shaped heat-sealable resin layer 4 is bonded thereto. When the heat-sealable resin layer 4 has two layers, mention is made of, for example, a method in which the adhesive layer 5 and one layer in the heat-sealable resin layer 4 are co-extruded onto the stainless steel foil 3, and the other layer in the heat-sealable resin layer 4 is then bonded thereto by a thermal lamination method. Mention is also made of a method in which the adhesive layer 5 and one layer in the heat-sealable resin layer 4 are co-extruded onto the stainless steel foil 3, and the other layer in the film-shaped heat-sealable resin layer 4 is bonded thereto. When the heat-sealable resin layer 4 is made to have three or more layers, the heat-sealable resin layer 4 can be formed using additionally a melt extrusion method, a thermal lamination method, a coating method or the like.

A laminate including the base material layer 1, the adhesive agent layer 2 formed as necessary, the stainless steel foil 3 subjected to a chemical conversion treatment, the adhesive layer 5 formed as necessary and the heat-sealable resin layer 4 in this order is formed in the manner described above. The laminate may be further subjected to a heating treatment by heat roll contact, hot air, application of near- or far-infrared rays, dielectric heating, thermal resistance heating or the like for enhancing the adhesion of the adhesive agent layer 2. As conditions for such a heating treatment, for example, the temperature is 150° C. or more and 250° C. or less, and the time is 1 hour or more and 10 hours or less.

In the battery packaging material of the first invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

When the battery element is packaged using the battery packaging material according to the first invention, two battery packaging materials used may be the same, or may be different. When the battery element is packaged using two different battery packaging materials, specific examples of the laminated structure of each battery packaging material include the following structures.

One battery packaging material: base material layer 1 (nylon layer)/adhesive agent layer 2 (two-liquid curable polyester resin layer)/stainless steel foil 3/adhesive layer 5 (acid-modified polypropylene layer)/heat-sealable resin layer 4 (polypropylene layer).

Other battery packaging material: base material layer 1 (acryl-urethane coating layer)/stainless steel foil 3/adhesive layer 5 (fluorine-based resin layer)/heat-sealable resin layer 4 (polypropylene).

4. Use of Battery Packaging Material

The battery packaging material according to the first invention is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the first invention such that a flange portion (region where a heat-sealable resin layer is in contact with itself) can be formed on the periphery of the battery element while a metal terminal connected to each of the positive electrode and the negative electrode protrudes to the outside, and the heat-sealable resin layer 4 at the flange portion is heat-sealed with itself, thereby providing a battery using a battery packaging material. When the battery element is stored using the battery packaging material according to the first invention, the battery packaging material according to the first invention is used such that the heat-sealable resin layer 4 is on the inner side (surface in contact with the battery element).

As described above, two battery packaging materials according to the first invention may be provided to store an electronic element in a space with two spaces combined together by heat-welding heat-sealable resin layers 4 with the heat-sealable resin layers 4 opposed to each other. The battery packaging material according to the first invention, and a sheet-shaped laminate as described above may be provided to store an electronic element in one space obtained by heat-welding heat-sealable layers 4 with the heat-sealable layers 4 opposed to each other.

The battery packaging material according to the first invention may be used for either a primary battery or a secondary battery, but is preferably used for a secondary battery. The type of a secondary battery to which the battery packaging material according to the first invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material of the first invention is applied include lithium ion batteries and lithium ion polymer batteries.

Second Embodiment

The second embodiment of the first invention is different from the above-described first embodiment in that an acid resistance film layer laminated on a surface of a stainless steel foil 3 is formed by a phosphoric acid chromate treatment using a resin. Hereinafter, the second embodiment will be described in detail. The second embodiment is identical to the first embodiment in configurations other than those that will be described in detail below.

In the second embodiment, an acid resistance film layer formed by a phosphoric acid chromate treatment using a resin is laminated on at least one surface of the stainless steel foil 3 to attain excellent piercing strength, electrolytic solution resistance and moldability. Particularly, when the stainless steel foil 3 is formed of austenite-based stainless steel, especially SUS 304 stainless steel, the stainless steel foil 3 has high affinity with the acid resistance film layer formed by a phosphoric acid chromate treatment using a resin, so that excellent electrolytic solution resistance is achieved. Further, formation of the resin layer increases electric resistance. Thus, when a battery is formed, internal insulation quality is improved, so that corrosion due to a short-circuit and deposition of foreign matters, and leakage of contents due to corrosion hardly occur.

In the second embodiment, the resin for use in a phosphoric acid chromate treatment is not particularly limited, but it is preferably a phenol resin. The phenol resin is preferably an aminated phenol polymer, and details of the aminated phenol polymer are as described in the first embodiment.

In the second embodiment, it is especially preferable that an acid resistance film layer formed by a phosphoric acid chromate treatment using a combination of a chromic acid compound, a phosphoric acid compound and a phenol resin (preferably the aminated phenol polymer) is provided on at least one surface of the stainless steel foil 3. Particularly, when the acid resistance film layer formed by a phosphoric acid chromate treatment is provided on the surface of the stainless steel foil 3 formed of austenite-based stainless steel, especially SUS 304 stainless steel, high piercing strength, excellent moldability and excellent electrolytic solution resistance are achieved. Further, formation of the resin layer increases electric resistance. Thus, when a battery is formed, internal insulation quality is improved, so that corrosion due to a short-circuit and deposition of foreign matters, and leakage of contents due to corrosion hardly occur.

In the second embodiment, the battery packaging material has excellent piercing strength, electrolytic solution resistance and moldability, and therefore the thickness of the stainless steel foil 3 can be set to 40 μm or less, or even 10 μm or more and 30 μm or less. When the stainless steel foil 3 is thick, the weight of the battery packaging material increases because the specific gravity of stainless steel is about three times as large as that of aluminum, and thus the power generation amount per unit weight decreases as compared to a similar battery including aluminum.

Third Embodiment

The third embodiment of the first invention is different from the above-described first embodiment in that at least one of layers situated on the base material layer 1 side from a stainless steel foil 3 is black. In the third embodiment, owing to a configuration as described above, the heat dissipation property of the stainless steel foil 3 is improved, and thus the stainless steel foil 3 heated during heat-sealing is inhibited from being kept at a high temperature for a long time, so that after heat-sealing, occurrence of positional displacement due to shifting of the heat-sealing surface can be effectively suppressed.

Since the heat capacity per unit volume of stainless steel is larger than that of aluminum, the temperature hardly varies. Stainless steel has a Young's modulus (spring constant) larger than that of aluminum, and reacts to return to its normal state after the pressure in heat-sealing is released. Thus, when a stainless steel foil is used, the stainless steel foil heated during heat-sealing is kept at a high temperature for a longer period of time, and more easily forced to peel off in this state as compared to a case where an aluminum foil that has been commonly used heretofore is used as a barrier layer. Accordingly, when a stainless steel foil is used, there is the problem that the heat-sealable resin layer 4 is hardly cooled after heat-sealing, and thus a high-fluidity state may be maintained, so that positional displacement easily occurs due to shifting of the heat-sealing surface. When the sealing surface is positionally displaced during cooling, the shape of a so called "polymer sump" generated during sealing becomes uneven. Thus, when the internal pressure increases due to generation of a gas or elevation of a temperature after formation of a battery, leakage of a gas and contents from the uneven part may occur. The heat-sealable resin layer is cured while positional displacement occurs, and therefore stress is apt to remain in the heat-sealable resin layer. Accordingly, uniformity of sealing strength is deteriorated, and this may cause leakage of a gas and contents.

On the other hand, in the third embodiment, at least one of layers on the base material layer 1 side from the stainless steel foil 3 is black, and therefore excellent heat dissipation property is exhibited, so that the stainless steel foil is easily cooled. Thus, a high-fluidity state is hardly maintained in the heat-sealable resin layer 4, so that positional displacement of the heat-sealing surface after heat-sealing is effectively suppressed.

In the third embodiment, at least one of layers situated on the base material layer 1 side from a stainless steel foil 3 may be black.

Examples of the preferred configuration for effectively dissipating heat from the stainless steel foil 3 during heat-sealing of the battery packaging material include the following aspects.

(1) A black printing layer is provided on the outer surface of the base material layer 1 (surface on a side opposite to the stainless steel foil 3). In this aspect, a black printing layer is provided on the outer surface of the base material layer 1 using an ink containing a black colorant as described later.

(2) The base material layer 1 is colored black. In this aspect, the base material layer 1 is colored black by including the later-described black colorant in a resin that forms the base material layer.

(3) A black printing layer is provided on the inner surface of the base material layer 1 (surface on the stainless steel foil 3 side). In this aspect, a black printing layer is provided on the inner surface of the base material layer 1 using an ink containing a black colorant as described later.

(4) The adhesive agent layer 2 is colored black. In this aspect, the adhesive agent layer 2 is colored black by including the later-described black colorant in a resin that forms the adhesive agent layer 2.

(5) A black colored layer is provided between the adhesive agent layer 2 and the stainless steel foil. In this aspect, a black colored layer is provided on a surface of the stainless steel foil 3 on the adhesive agent layer 2 side using a resin containing the later-described black colorant.

Among them, the aspects (3), (4) and (5) are especially preferable for suppressing generation of foreign matters.

The method for making black a layer such as the base material layer 1, the adhesive agent layer 2, the printing layer and the colored layer is not particularly limited, and for example, a black colorant etc. may be blended in a resin or ink that forms each layer. The black colorant is not particularly limited, and examples thereof include carbon-based black pigments such as carbon black; oxide-based black pigments such as iron oxides (e.g. magnetite-type triiron tetraoxide), composite oxides including copper and chromium, composites including copper, chromium and zinc, and titanium-based oxides; and black dyes. The particle size of the black pigment is not particularly limited, but it is preferably about 1 nm or more and 20 μm or less. The particle size of the black pigment means a value measured by a laser diffraction/scattering method. For further enhancing the effect, fine particles or porous fine particles of silica, alumina, barium or the like, or a metal filler of aluminum, copper, nickel or the like may be added. When a printing layer is formed on the outer surface as in the aspect (1), the friction can be reduced as described above, and various functions can be imparted.

Examples of resins to be used in aspects (1), (3) and (5) include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers, silicone-based resins and fluorine-based resins. It is desirable to use a crosslinking agent and a curing agent in combination as necessary.

The blending ratio of the black colorant in each layer is not particularly limited as long as the layer is made black, but it is, for example, about 5% by mass or more and 50% by mass or less, more preferably about 8% by mass or more and 20% by mass or less.

By combining the third embodiment with the later-described fourth embodiment, occurrence of positional displacement due to shifting of the heat-sealing surface of the heat-sealable resin layer 4 after heat-sealing can be further effectively suppressed.

Fourth Embodiment

The fourth embodiment of the first invention is different from the above-described first embodiment in that the melt flow rate (MFR) of the heat-sealable resin layer 4 at 230° C. is 15 g/10 minutes or less. In the fourth embodiment, owing to a configuration as described above, the heat-sealable resin layer 4 has low fluidity, and thus even when the stainless steel foil heated during heat-sealing is kept at a high temperature for a long period of time, occurrence of positional displacement due to shifting of the heat-sealing surface of the heat-sealable resin layer 4 is effectively suppressed.

The MFR of the heat-sealable resin layer 4 at 230° C. is preferably about 1 g/10 minutes or more and 15 g/10 minutes or less, more preferably 2 g/10 minutes or more and 15 g/10 minutes or less.

As a method for setting the MFR of the heat-sealable resin layer 4 to the above-mentioned value, the composition of the resin that forms the heat-sealable resin layer 4 may be appropriately set. Particularly, when polypropylene is used, the lower the MFR, the more hardly the sealant is shifted in a heated state after heat-sealing. Formation of a so called "polymer sump" during heat-sealing is stabilized. Thus, sealing property in heat-sealing is stabilized. When the MFR is high, the formed polymer sump is small, and if displacement occurs at the sealing position, the polymer sump is apt to be uneven because the formed polymer sump is small. Generation of a gas in the battery may cause breakage to start at an uneven part when the internal pressure is increased due to temperature elevation.

Figure 8:
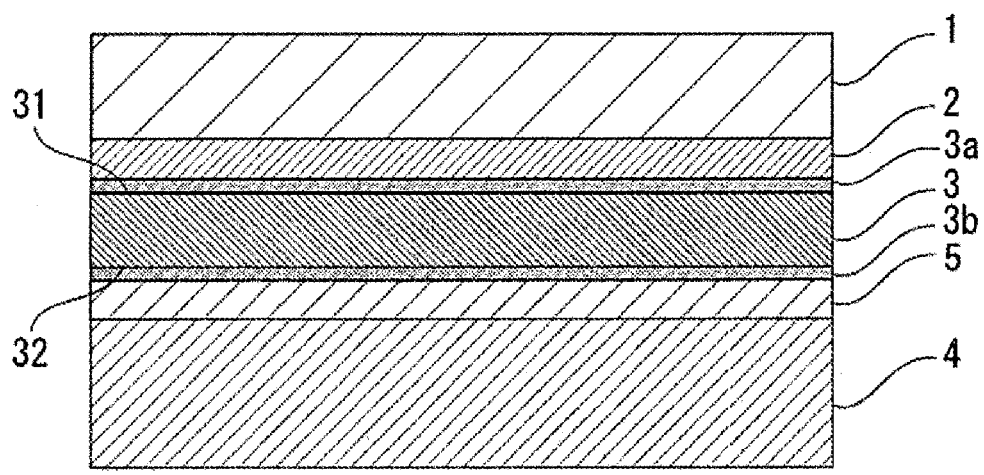
FIG. 8 is a schematic sectional view of one example of the laminated structure of the battery packaging material according to the second invention.
Figure 9:
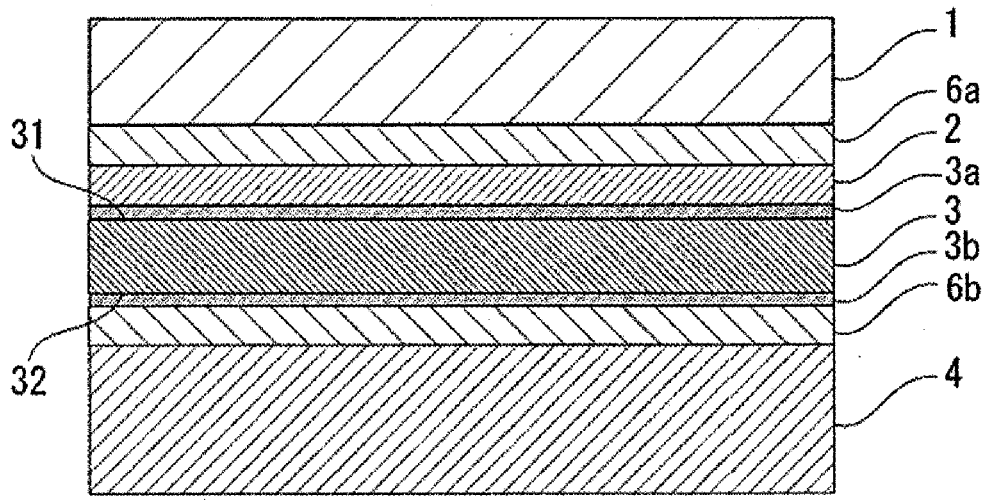
FIG. 9 is a schematic sectional view of one example of the laminated structure of the battery packaging material according to the second invention.

5. Laminated Structure of Battery Packaging Material According to Second Invention The battery packaging material according to the second invention includes a laminate including a stainless steel foil 3 having a first surface 31 and a second surface 32, a base material layer 1 laminated on the first surface 31 side, and a heat-sealable resin layer 4 laminated on the second surface 32 side. When the battery packaging material according to the second invention is used in a battery, the base material layer 1 serves as an outermost layer, and the heat-sealable resin layer 4 serves as an innermost layer (battery element side). During construction of a battery, the heat-sealable resin layer 4 situated on the peripheral edge of a battery element is brought into contact with itself, and heat-welded to hermetically seal the battery element, so that the battery element is encapsulated. As shown in FIG. 8, the battery packaging material according to the second invention may include an adhesive agent layer 2 between the base material layer 1 and the stainless steel foil 3. As shown in FIG. 9, the battery packaging material according to the second invention may include an adhesive layer 5 between the stainless steel foil 3 and the heat-sealable resin layer 4.

The battery packaging material according to the second invention may include acid resistance film layers 3a and 3b on the first surface 31 and the second surface 32, respectively, of the stainless steel foil 3. In FIGS. 6 to 9, the acid resistance film layer 3a is laminated on the first surface 31 of the stainless steel foil 3, and the acid resistance film layer 3b is laminated on the second surface 32 of the stainless steel foil 3.

Further, in the battery packaging material according to the second invention, at least one layer laminated on the first surface 31 side of the stainless steel foil 3 forms a first protective layer having an elastic modulus of 100 MPa or more as measured by a method conforming to JIS K7127. Further, at least one layer laminated on the second surface 32 side of the stainless steel foil 3 forms a second protective layer having an elastic modulus of 100 MPa or more as measured by a method conforming to JIS K7127.

In the battery packaging material according to the second invention, the layer that forms the first protective layer may be, for example, the base material layer 1. As shown in FIG. 9, the battery packaging material according to the second invention may include a first protective layer 6a provided between the base material layer 1 and the stainless steel foil 3.

The layer that forms the second protective layer may be the heat-sealable resin layer 4, or an adhesive layer 5. As shown in FIG. 9, the battery packaging material according to the second invention may include a second protective layer 6b provided between the stainless steel foil 3 and the heat-sealable resin layer 4.

In the battery packaging material according to the second invention, at least one layer, or a plurality of layers may be laminated as each of the first protective layer and the second protective layer.

Figure 4:
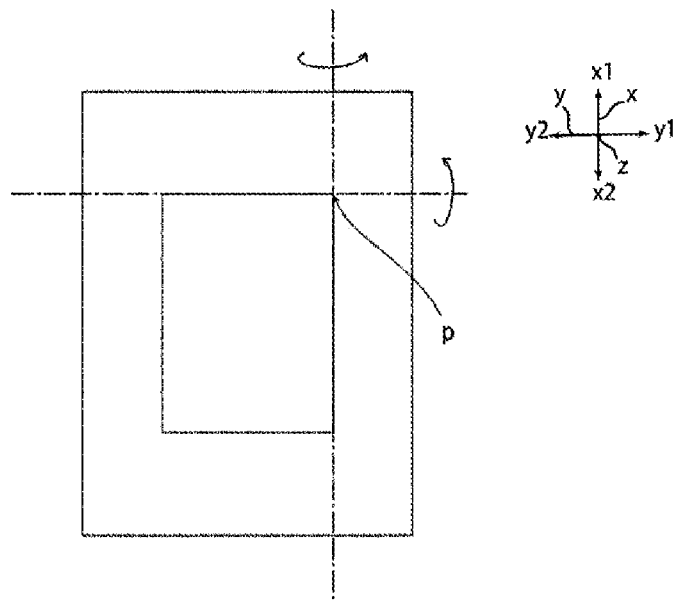
FIG. 4 is a schematic plan view showing one example of a molded battery packaging material according to a second invention.
Figure 5:
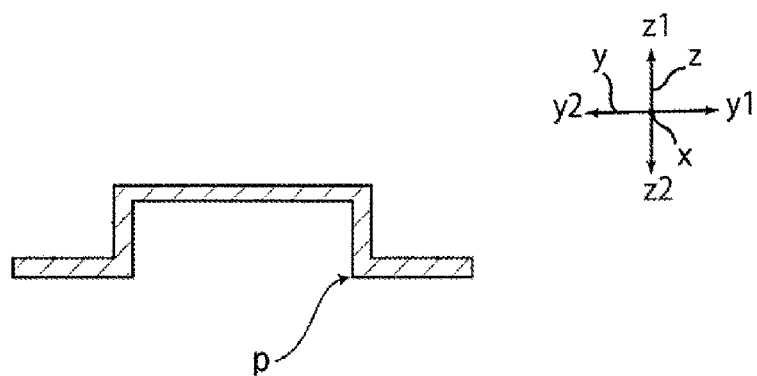
FIG. 5 is a schematic plan view showing one example of the molded battery packaging material according to the second invention.
Figure 6:
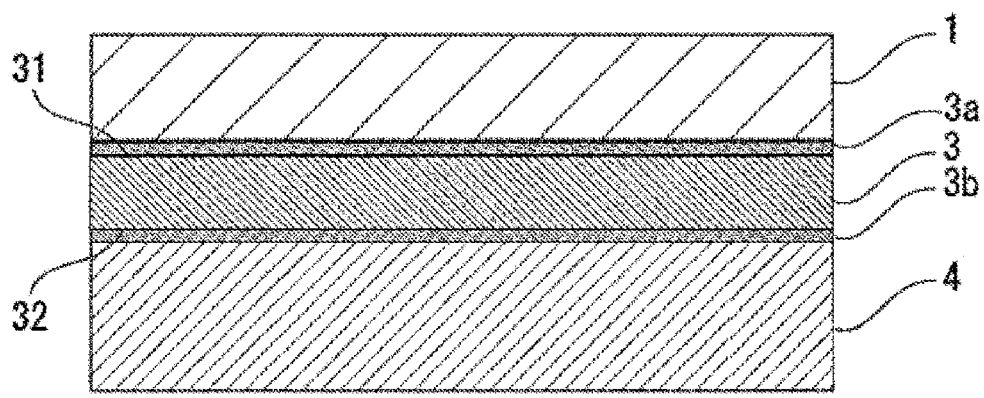
FIG. 6 is a schematic sectional view of one example of a laminated structure of the battery packaging material according to the second invention.
Figure 7:
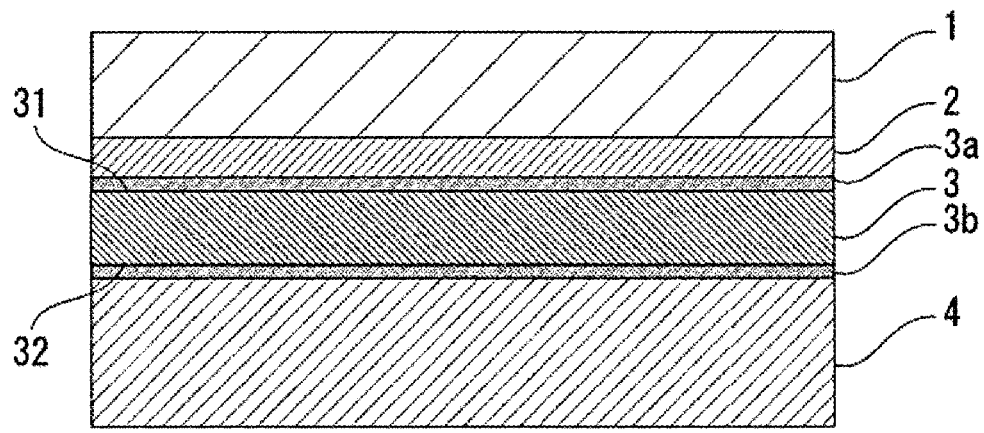
FIG. 7 is a schematic sectional view of one example of the laminated structure of the battery packaging material according to the second invention.

As described above, stainless steel has low moldability while having high rigidity (piercing strength), and therefore has the problem that pinholes, cracks and the like are easily generated in a stainless steel foil in molding of a battery packaging material. Particularly, in the battery packaging material according to the second invention, a concave portion is formed by cold molding, battery elements such as an electrode and an electrolytic solution are disposed in a space formed by the concave portion, and heat-sealable resin layers are heat-welded to obtain a battery with battery elements stored in the battery packaging material as shown in, for example, FIG. 4 or FIG. 5. Here, the battery packaging material after molding may be bent at the peripheral edge portion to be folded in four. There is the problem that at, for example, a peak portion p as shown in FIGS. 4 and 5, the battery packaging material is bent twice by four-folding, and therefore particularly pinholes are easily generated.

On the other hand, in the battery packaging material according to the second invention, the first protective layer and the second protective layer each having an elastic modulus of 100 MPa or more as measured by a method conforming to JIS K7127 are provided, respectively, on both surfaces of the stainless steel foil, so that cracks in bending of the stainless steel foil can be suppressed, and thus the battery packaging material has not only high piercing strength but also moldability.

For further improving moldability of the battery packaging material according to the second invention, the elastic modulus measured by a method conforming to JIS K7127 of the first protective layer and the second protective layer is preferably about 100 MPa or more and 6,000 MPa or less, more preferably about 300 MPa or more and 5,000 MPa or less, still more preferably about 750 MPa or more and 5,000 MPa or less.

6. Compositions of Layers Forming Battery Packaging Material of Second Invention

[Base Material Layer 1]

In the battery packaging material according to the second invention, the base material layer 1 is a layer that forms the outermost layer. The material that forms the base material layer 1 is not particularly limited as long as it has an insulation quality. Examples of the material that forms the base material layer 1 include polyester resins, polyamide resins, epoxy resins, acrylic resins, fluororesins, polyurethane resins, silicone resins, phenol resins, polyether imide resins, polyimide resins, polyolefin resins and mixtures and copolymers thereof.

The base material layer 1 in the battery packaging material according to the second invention is identical in other configurations to the base material layer 1 in the battery packaging material according to the first invention.

[Adhesive Agent Layer 2]

In the battery packaging material according to the second invention, the adhesive agent layer 2 is a layer provided as necessary for the purpose of improving adhesion between the base material layer 1 and the stainless steel foil 3. The base material layer 1 and the stainless steel foil 3 may be directly laminated.

The adhesive agent layer 2 in the battery packaging material according to the second invention is identical in other configurations to the adhesive agent layer 2 in the battery packaging material according to the first invention.

[Stainless Steel Foil 3]

In the battery packaging material according to the second invention, the stainless steel foil 3 is a layer which is intended to improve the strength of the battery packaging material, and also functions as a barrier layer for preventing ingress of water vapor, oxygen, light and the like into the battery.

The stainless steel foil 3 in the battery packaging material according to the second invention is identical in other configurations to the stainless steel foil 3 in the battery packaging material according to the first invention.

[Chemical Conversion Treatment Layers 3a and 3b]

In the battery packaging material according to the second invention, it is preferable that an acid resistance film layer 3b is formed on at least the second surface 32 of the stainless steel foil 3. Accordingly, a battery packaging material having high piercing strength and excellent electrolytic solution resistance and moldability can be obtained.

In the second invention, the battery packaging material may further include the acid resistance film layer 3a on the first surface 31 of the stainless steel foil 3 as necessary for stabilization of bonding between the stainless steel foil 3 and a layer adjacent thereto, prevention of dissolution and corrosion, and so on. In the second invention, it is more preferable that acid resistance film layers 3a and 3b are laminated on the first surface 31 and the second surface 32, respectively, of the stainless steel foil 3. In FIGS. 6 to 9, the acid resistance film layer 3a is laminated on the first surface 31 of the stainless steel foil 3, and the acid resistance film layer 3b is laminated on the second surface 32 of the stainless steel foil 3 as described above.

The acid resistance film layers 3a and 3b in the battery packaging material according to the second invention are identical in other configurations to the acid resistance film layer in the battery packaging material according to the first invention.

[Heat-Sealable Resin Layer 4]

In the battery packaging material according to the second invention, the heat-sealable resin layer 4 is laminated on the second surface 32 side of the stainless steel foil 3, corresponds to the innermost layer, and during construction of a battery, the heat-sealable resin layer 4 is heat-welded to itself to hermetically seal the battery element. The heat-sealable resin layer 4 may be formed of a plurality of layers.

The heat-sealable resin layer 4 in the battery packaging material according to the second invention is identical in other configurations to the heat-sealable resin layer 4 in the battery packaging material according to the first invention.

[Adhesive Layer 5]

In the battery packaging material of the second invention, the adhesive layer 5 may be further provided between the stainless steel foil 3 and the heat-sealable resin layer 4 as shown in FIG. 8 for the purpose of, for example, firmly bonding the stainless steel foil 3 and the heat-sealable resin layer 4. The adhesive layer 5 may be formed of one layer, or may be formed of a plurality of layers.

As described above, the adhesive layer 5 may form the second protective layer. When the adhesive layer 5 has an elastic modulus of 100 MPa or more as measured by a method conforming to JIS K7127, the adhesive layer 5 may form the second protective layer.

(First Protective Layer 6a)

As shown in, for example, FIG. 9, in the battery packaging material according to the second invention, the first protective layer 6a having the above-mentioned elastic modulus is laminated, and therefore for example even when the base material layer 1 does not satisfy the above-mentioned elastic modulus, and does not form the first protective layer, the battery packaging material provided with the stainless steel foil can exhibit high piercing strength and excellent moldability.

When the first protective layer 6a is provided, the first protective layer 6a may be in contact with the stainless steel foil 3 directly, or with the adhesive agent layer 2 interposed therebetween. Preferably, the battery packaging material has a laminated structure in which the base material layer 1, the first protective layer 6a, the adhesive agent layer 2 and the stainless steel foil 3 are laminated in this order.

The first protective layer 6a can be formed, for example, of a resin. The resin that forms the first protective layer 6a is not particularly limited, and examples thereof include polyester resins, polyamide resins, epoxy resins, acrylic resins, fluororesins, polyurethane resins, silicone resins, phenol resins, polyether imide resins, polyimide resins, polyolefin resins and mixtures and copolymers thereof. The resins may be used alone, or may be used in combination of two or more thereof.

The thickness of the first protective layer 6a is not particularly limited, but is preferably about 1 μm or more and 50 μm or less, more preferably about 2 μm or more and 30 μm or less.

(Second Protective Layer 6b)

In the battery packaging material according to the second invention, the second protective layer 6b may be laminated between the stainless steel foil 3 and the heat-sealable resin layer 4 as shown in, for example, FIG. 9. The second protective layer 6b having the above-mentioned elastic modulus is laminated, and therefore for example even when the heat-sealable resin layer 4 and the insulating layer 5 do not satisfy the above-mentioned elastic modulus, and does not form the second protective layer, the battery packaging material provided with the stainless steel foil can exhibit high piercing strength and excellent moldability.

When the second protective layer 6b is provided, the second protective layer 6b may be in contact with the stainless steel foil 3 directly, or with the adhesive layer 5 interposed therebetween. Preferably, the battery packaging material has a laminated structure in which the stainless steel foil 3, the adhesive layer 5, the second protective layer 6b and the heat-sealable resin layer 4 are laminated in this order.

The second protective layer 6b can be formed, for example, of a resin. The resin that forms the second protective layer 6b is not particularly limited, and examples thereof include polyester resins, polyamide resins, epoxy resins, acrylic resins, fluororesins, polyurethane resins, silicone resins, phenol resins, polyether imide resins, polyimide resins, polyolefin resins and mixtures and copolymers thereof. The resins may be used alone, or may be used in combination of two or more thereof. Among them, polyester resins such as polyethylene terephthalate are preferable for exhibiting high piercing strength and excellent moldability in the battery packaging material provided with the stainless steel foil 3. For example, when a polyester resin is used as the resin that forms the second protective layer 6b, an elastic modulus of 100 MPa and more, even 300 MPa and more, or even 750 MPa and more can be achieved as the above-mentioned elastic modulus. The polyester resin film is preferably a stretched film.

The thickness of the second protective layer 6b is not particularly limited, but is preferably about 1 μm or more and 50 μm or less, more preferably about 2 μm or more and 30 μm or less.

In the battery packaging material according to the second invention, the total thickness of the laminate including the layers described above is not particularly limited, but it is preferably 110 μm or less, more preferably about 42 μm or more and 85 μm or less, still more preferably about 45 μm or more and 70 μm or less for reducing the thickness of the battery packaging material, and favorably exhibiting high piercing strength and excellent moldability.

In the battery packaging material according to the second invention, the piercing strength of the laminate as measured by a measurement method conforming to JIS Z 1707 1997 is preferably 20 N or more, more preferably 30 N or more.

Further, it is preferable that where T is a total thickness (μm) of the laminate, TS is a thickness (μm) of the stainless steel foil, and F is a piercing strength (N) of the laminate as measured by a measurement method conforming to JIS Z 1707 1997, F/T is 0.3 (N/μm) or more, and F/TS is 0.7 (N/μm) or more for reducing the thickness of the battery packaging material according to the second invention, and favorably exhibiting high piercing strength and excellent moldability.

7. Method for Producing Battery Packaging Material According to Second Invention While the method for producing the battery packaging material according to the second invention is not particularly limited as long as a laminate in which layers each having a predetermined composition are laminated is obtained, for example the following method is shown as an example.

A laminate including the base material layer 1, the adhesive agent layer 2 formed as necessary, the stainless steel foil 3 subjected to a chemical conversion treatment at one surface as necessary, the adhesive layer 5 formed as necessary and the heat-sealable resin layer 4 in this order is prepared through the same lamination step as described for the battery packaging material according to the first invention. In the second invention, the laminate may be further subjected to a heating treatment by heat roll contact, hot air, application of near- or far-infrared rays, dielectric heating, thermal resistance heating or the like for enhancing the adhesion of the adhesive agent layer 2. As conditions for such a heating treatment, for example, the temperature is 150° C. or more and 250° C. or less, and the time is 1 hour or more and 10 hours or less.

When the first protective layer 6a is further laminated between the base material layer and the stainless steel foil in the above-mentioned lamination step, a resin composition for forming the first protective layer 6a may be applied to an adjacent layer, or a resin film for forming the first protective layer 6a may be bonded to an adjacent layer. When the second protective layer 6b is further laminated between the stainless steel foil 3 and the heat-sealable resin layer 4, a resin composition for forming the second protective layer 6b may be applied to an adjacent layer, or a resin film for forming the second protective layer 6b may be bonded to an adjacent layer.

The method for producing the battery packaging material according to the second invention is identical in other configurations to method for producing the battery packaging material according to the first invention. The use of the battery packaging material according to the second invention is the same as the use of the first battery packaging material.

EXAMPLES

The present invention will be described in detail below by showing examples and comparative examples. It is to be noted, however, that the present invention is not limited to the examples. In examples and comparative examples, the elastic modulus of each layer was measured by a method conforming to JIS K7127.

Production of Battery Packaging Material

A battery packaging material was produced in each of Examples 1A to 17A and Comparative Examples 1A and 2A. The thickness, material and properties (melting point and MFR) and so on of each layer are as shown in Table 1A. Details of formation of an acid resistance film layer in examples and comparative examples below are as follows.

(Phosphoric Acid Chromate Treatment)

A treatment liquid containing a phenol resin, a chromium fluoride compound and phosphoric acid was applied to a surface of a stainless steel foil or an aluminum foil by a roll coating method in such a manner that the application amount of chromium was 10 mg/m$^2$ (dry weight), and baking was performed for 20 seconds under a condition of a film temperature of 180° C. or higher.

(Chromate Treatment)

A treatment liquid containing chromic acid was applied to a surface of a stainless steel foil or an aluminum foil by a roll coating method in such a manner that the application amount of chromium was 10 mg/m$^2$ (dry weight), and baking was performed for 20 seconds under a condition of a film temperature of 180° C. or higher.

(Alumina Treatment)

A treatment liquid containing a phenol resin, alumina and phosphoric acid was applied to a surface of a stainless steel foil or an aluminum foil by a roll coating method in such a manner that the application amount was 1μ (dry thickness), and baking was performed for 20 seconds under a condition of a film temperature of 200° C. or higher.

(Cerium Treatment)

A treatment liquid containing cerium oxide, phosphoric acid and an acryl-based resin as main components was applied to a surface of a stainless steel foil or an aluminum foil by a roll coating method in such a manner that the application amount was 1μ (dry thickness), and baking was performed for 20 seconds under a condition of a film temperature of 200° C. or higher.

Example 1A

A polyethylene terephthalate (PET) film as a base material layer was coated with an adhesive including a polyester resin as a main agent and a TDI-based isocyanate as a curing agent, drying was performed, an austenite-based stainless steel foil (SUS 304) subjected to a phosphoric acid chromate treatment at both surfaces was then laminated, and an aging treatment was performed at 80° C. for 3 days. Thereafter, an adhesive layer (acid-modified PP) obtained by blending an acid-modified propylene-ethylene copolymer and low-density polyethylene, and random polypropylene were laminated to the other surface by a co-extrusion method. Further, for increasing adhesive strength, the resulting laminate was heated for 30 seconds at 180° C., a temperature equal to or higher than the softening point of the acid-modified PP.

Example 2A

A polyethylene terephthalate (PET) film as a base material layer was coated with an adhesive including a polyester resin as a main agent and a TDI-based isocyanate as a curing agent, drying was performed, the base material layer was then bonded to a non-chromate-treated surface of a stainless steel foil (SUS 304) subjected to a chromate treatment at one surface, and an aging treatment was performed at 60° C. for 5 days. Thereafter, an adhesive layer (acid-modified PP) obtained by blending an acid-modified propylene-ethylene copolymer and low-density polyethylene, and random polypropylene were laminated to the other surface by a co-extrusion method. Further, for increasing adhesive strength, the resulting laminate was heated for 30 seconds at 180° C., a temperature equal to or higher than the softening point of the acid-modified PP.

Example 3A

A polyethylene terephthalate (PET) film as a base material layer was coated with an adhesive including a polyether resin as a main agent and a MDI-based isocyanate as a curing agent, drying was performed, the base material layer was then bonded to a stainless steel foil (SUS 304) subjected to an alumina treatment at both surfaces, and an aging treatment was performed at 40° C. for 7 days. Thereafter, an adhesive layer including a fluorine-based resin and an IPDI-based isocyanate was applied to the other surface by solution coating, drying was performed, and was bonded to a block PP surface of a sealant film including block PP/random PP, and an aging treatment was performed at 50° C. for 5 days.

Example 4A

A polyethylene terephthalate (PET) film as a base material layer was coated with an adhesive including a polyester-polyether resin as a main agent and a HDI-based isocyanate as a curing agent, drying was performed, the base material layer was then bonded to a stainless steel foil (SUS 316) subjected to an alumina treatment at one surface, and an aging treatment was performed at 40° C. for 7 days. Thereafter, a multilayer film including acid-modified polypropylene (acid-modified PP) and random polypropylene (random PP) was laminated by a thermal lamination method in such a manner that acid-modified PP was on the stainless steel foil side.

Example 5A

A polybutylene terephthalate (PBT) film as a base material layer was coated with an adhesive including a polyester resin as a main agent and a TDI adduct-based isocyanate as a curing agent, drying was performed, the base material layer was bonded to a stainless steel foil (SUS 304) subjected to a phosphoric acid chromate treatment at both surfaces, and an aging treatment was performed at 60° C. for 7 days. Thereafter, a multilayer film including acid-modified PP and random PP was laminated by a thermal lamination method in such a manner that acid-modified PP was on the stainless steel foil side.

Example 6A

A polybutylene naphthalate (PEN) film as a base material layer was coated with an adhesive including a polyester resin as a main agent and a TDI adduct-based isocyanate as a curing agent, drying was performed, the base material layer was bonded to an acid resistance film layer-non-formed surface of stainless steel foil (SUS 304) subjected to a phosphoric acid chromate treatment at one surface, and an aging treatment was performed at 60° C. for 7 days. Thereafter, acid-modified PP and block PP were laminated to the other surface by a co-extrusion method.

Example 7A

A nylon film as a base material layer was coated with an adhesive including a polyester resin as a main agent and a TDI adduct-based isocyanate as a curing agent, drying was performed, the base material layer was bonded to a stainless steel foil (SUS 304) subjected to a phosphoric acid chromate treatment at both surfaces, and an aging treatment was performed at 60° C. for 7 days. Thereafter, an adhesive layer including acid-modified PP and oxazoline was applied to the other surface by solution coating, drying was performed, a sealant film including random PP was bonded to the block PP surface, and an aging treatment was performed at 60° C. for 5 days.

Example 8A

A co-extruded film of PET/nylon as a base material layer was coated with an adhesive including a polyester resin as a main agent and a MDI-based isocyanate as a curing agent, drying was performed, the base material layer was bonded to an acid resistance film layer-non-formed surface of stainless steel foil (SUS 304) subjected to a phosphoric acid chromate treatment at one surface, and an aging treatment was performed at 60° C. for 7 days. Thereafter, an adhesive layer including acid-modified PP, an epoxy resin and an acid catalyst was applied to the other surface by solution coating, drying was performed, a sealant film including random/block/random was bonded to the block PP surface, and an aging treatment was performed at 80° C. for 5 days.

Example 9A

By solution coating, a main agent resin composed of polyester-polyurethane and acrylic resin, and a MDI-based curing agent were laminated as a base material layer to a stainless steel foil (SUS 304) subjected to a phosphoric acid chromate treatment at both surfaces, drying was performed, and aging was then performed at 80° C. for 5 days to form a laminate of base material layer/acid resistance film layer/ stainless steel foil/acid resistance film layer. Thereafter, an adhesive layer including acid-modified PP, an epoxy resin and an acid catalyst was applied to a surface of the acid resistance film layer by solution coating, drying was performed, a sealant film including random PP/block PP/random PP was bonded to the block PP surface, and an aging treatment was performed at 80° C. for 5 days.

Example 10A

A polyethylene terephthalate (PET) film as a base material layer was coated with an adhesive including a polyester resin as a main agent and a TDI-based isocyanate as a curing agent and containing 10% of black carbon, drying was performed, a stainless steel foil (SUS 304) subjected to a phosphoric acid chromate treatment at both surfaces was then laminated, and an aging treatment was performed at 80° C. for 3 days. Thereafter, an adhesive layer (acid-modified PP) obtained by blending an acid-modified propylene-ethylene copolymer and low-density polyethylene, and random polypropylene (random PP) were laminated to the other surface by a co-extrusion method. Further, for increasing adhesive strength, the resulting laminate was heated for 30 seconds at 180° C., a temperature equal to or higher than the softening point of the acid-modified PP.

Example 11A

A polycarbonate (PC) film containing 5% of carbon as a base material layer was coated with an adhesive including a polyester resin as a main agent and a TDI-based isocyanate as a curing agent, drying was performed, a stainless steel foil (SUS 304) subjected to a phosphoric acid chromate treatment at both surfaces was then laminated, and an aging treatment was performed at 80° C. for 3 days. Thereafter, an adhesive layer (acid-modified PP+filler) obtained by blending an acid-modified propylene-ethylene copolymer and low-density polyethylene containing 5% of laminar montmorillonite was extruded and laminated to the other surface of the stainless steel foil in such a manner that the adhesive layer (acid-modified PP+filler) was sandwiched by a random polypropylene film of a heat-sealable resin layer.

Example 12A

A polyethylene terephthalate (PET) film as a base material layer was coated with a composition containing a polyester resin and an acrylic resin as a main agent, a MDI-based isocyanate as a curing agent, and black carbon (10%) to form a printing layer, drying was performed, and aging was then performed at 40° C. for 3 days. Further, a stainless steel foil (SUS 304) subjected to a phosphoric acid chromate treatment at both surfaces was laminated to the printing layer, and an aging treatment was performed at 80° C. for 3 days. Thereafter, a multilayer film including acid-modified PP and random PP was laminated to the other surface of the stainless steel foil by thermal lamination in such a manner that the acid-modified PP surface of the multilayer film was on the stainless steel foil side. Further, a 3 μm matte layer was formed by coating the outer surface of the PET film of the base material layer with an outer layer coating agent obtained by adding a MDI-based isocyanate curing agent, 5% of silica and 2000 ppm of erucic acid amide to a main agent including a polyurethane resin and an acrylic resin, and aging was performed at 45° C. for 5 days.

Example 13A

A nylon film as a base material layer was coated with a coating obtained by adding 10% of black carbon to an adhesive including a polyester resin as a main agent and a TDI-based isocyanate as a curing agent, drying was performed, a stainless steel foil (SUS 304) subjected to a phosphoric acid chromate treatment at both surfaces was then laminated, and an aging treatment was performed at 80° C. for 3 days. Thereafter, an adhesive layer including acid-modified PP, an epoxy resin and an acid catalyst was applied to the other surface of the stainless steel foil by solution coating, drying was performed, a sealant film including random PP/block PP/random PP was bonded to the block PP surface, and an aging treatment was performed at 80° C. for 5 days. Further, a 3 μm matte layer was formed by coating the outer surface of the nylon film with an outer layer coating agent obtained by adding a HDI-based isocyanate curing agent, 5% of silica and 2000 ppm of erucic acid amide to a main agent including a polyurethane resin, and aging was performed at 45° C. for 5 days.

Example 14A

On one surface of a polyethylene terephthalate (PET) film as a base material layer, a 5 μm outer layer was formed beforehand using an outer layer coating agent obtained by adding a MDI-based isocyanate curing agent, 12% of black carbon, 3% of silica and 1000 ppm of erucic acid amide to a main agent including a polyurethane resin and an acrylic resin. Next, a surface of the base material on a side opposite to the outer layer was coated with an adhesive including a polyester resin as a main agent and a TDI-based isocyanate as a curing agent, drying was performed, a stainless steel foil (SUS 301) subjected to a phosphoric acid chromate treatment at both surfaces was then laminated, and an aging treatment was performed at 80° C. for 3 days. Thereafter, an adhesive layer (acid-modified PP) obtained by blending an acid-modified propylene-ethylene copolymer and low-density polyethylene was extruded and laminated to the other surface of the stainless steel foil in such a manner that the adhesive layer (acid-modified PP) was sandwiched by a random polypropylene (random PP) film of a heat-sealable resin layer.

Example 15A

By solution coating, a solution containing a main agent resin composed of polyester-polyurethane and acrylic resin, a MDI-based curing agent, 20% of black carbon, 5% of silica and 2000 ppm of stearic acid amide were laminated as a base material layer to a stainless steel foil (SUS 304) subjected to a phosphoric acid chromate treatment at both surfaces, drying was performed, and aging was then performed at 80° C. for 5 days to form a laminate of base material layer/acid resistance film layer/stainless steel foil/ acid resistance film layer. Thereafter, an adhesive layer including acid-modified PP, an epoxy resin and an acid catalyst was applied to a surface of the acid resistance film layer by solution coating, drying was performed, a sealant film including random PP/block PP/random PP was bonded to the block PP surface, and an aging treatment was performed at 80° C. for 5 days.

Example 16A

A polyethylene terephthalate (PET) film as a base material layer was coated with an adhesive including a polyester resin as a main agent and a TDI-based isocyanate as a curing agent, drying was performed, a stainless steel foil (SUS 304) subjected to a phosphoric acid chromate treatment at both surfaces was then laminated, and an aging treatment was performed at 80° C. for 3 days. Thereafter, an adhesive layer (acid-modified PP) obtained by blending an acid-modified propylene-ethylene copolymer and low-density polyethylene, and random polypropylene (random PP) were laminated to the other surface by a co-extrusion method. Further, for increasing adhesive strength, the resulting laminate was heated for 30 seconds at 180° C., a temperature equal to or higher than the softening point of the acid-modified PP.

Example 17A

A polyethylene terephthalate (PET) film as a base material layer was coated with an adhesive including a polyester resin as a main agent and a TDI-based isocyanate as a curing agent, drying was performed, a ferrite-based stainless steel foil (SUS YSU 190) subjected to a phosphoric acid chromate treatment at both surfaces was then laminated, and an aging treatment was performed at 80° C. for 3 days. Thereafter, an adhesive layer (acid-modified PP) obtained by blending an acid-modified propylene-ethylene copolymer and low-density polyethylene, and random polypropylene (random PP) were laminated to the other surface by a co-extrusion method. Further, for increasing adhesive strength, the resulting laminate was heated for 30 seconds at 180° C., a temperature equal to or higher than the softening point of the acid-modified PP.

Comparative Example 1A

A polyethylene terephthalate (PET) film as a base material layer was coated with an adhesive including a polyester resin as a main agent and a TDI-based isocyanate as a curing agent, drying was performed, a 8021-type aluminum foil subjected to a phosphoric acid chromate treatment at both surfaces was then laminated, and an aging treatment was performed at 80° C. for 3 days. Thereafter, an adhesive layer (acid-modified PP) obtained by blending an acid-modified propylene-ethylene copolymer and low-density polyethylene, and random polypropylene (random PP) were laminated to the other surface by a co-extrusion method. Further, for increasing adhesive strength, the resulting laminate was heated for 30 seconds at 180° C., a temperature equal to or higher than the softening point of the acid-modified PP.

Comparative Example 2A

A polyethylene terephthalate (PET) film as a base material layer was coated with an adhesive including a polyester resin as a main agent and a TDI-based isocyanate as a curing agent, drying was performed, a stainless steel foil (SUS 304) which was not subjected to a chemical conversion treatment was then laminated, and an aging treatment was performed at 80° C. for 3 days. Thereafter, an adhesive layer (acid-modified PP) obtained by blending an acid-modified propylene-ethylene copolymer and low-density polyethylene, and random polypropylene (random PP) were laminated to the other surface by a co-extrusion method. Further, for increasing adhesive strength, the resulting laminate was heated for 30 seconds at 180° C., a temperature equal to or higher than the softening point of the acid-modified PP.

(Piercing Test)

The battery packaging material obtained in each of the above-described examples and comparative examples was cut to prepare a strip piece of 120 mm×80 mm, and the strip piece was used as a test sample. The piercing strength of each test sample was measured by a method conforming to JIS Z 1707 1997 using a piercing tester (MX2-500N manufactured by IMADA CO., LTD.). The results are shown in Table 2A.

(Evaluation of Moldability)

The battery packaging material obtained in each of the above-described examples and comparative examples was cut to prepare a strip piece of 120 mm×80 mm, and the strip piece was used as a test sample. The test sample was cold-molded by units of 0.1 mm in molding depth at a pressing pressure of 0.4 MPa using a mold of 30×50 mm. The test sample was molded with N=30 at each depth, presence/absence of pinholes and cracks in the metal layer of the molded battery packaging material was checked, and a depth at which pinholes and cracks were not generated was defined as a molding limit. Further, the molding limit value was divided by a total thickness (μm) to obtain a ratio of the molding limit to the total thickness, and the values of the ratios for test samples were compared. The results are shown in Table 2A.

(Evaluation of Electrolytic Solution Resistance)

The battery packaging material obtained in each of the above-described examples and comparative examples was cut to a size of 80 mm×150 mm, and then cold-molded to a depth of 1.0 mm at 0.4 MPa using a mold (female mold) having an opening size of 35 mm×50 mm and a mold (male mold) corresponding thereto, so that a recess portion was formed at the central part of the battery packaging material. The concave portion was filled with 1 g of the electrolytic solution (ethylene carbonate, diethyl carbonate and dimethyl carbonate (volume ratio 1:1:1) mixed so as to contain 1 M $LiPF_6$), another battery packaging material was superimposed on the concave portion in such a manner that the heat-sealable resin layers faced each other, and the battery packaging materials are heat-sealed at the peripheral edge portion. As conditions for heat-sealing, the temperature was 190° C., the surface pressure was 1.0 MPa, and the time was 3 seconds. This was stored at 85° C. for 1 day, and then unsealed, and it was visually checked whether or not delamination occurred between the barrier layer (stainless steel foil or aluminum foil) and the heat-sealable layer. The results are shown in Table 2.

(Evaluation of Insulation Quality)

The battery packaging material obtained in each of the above-described examples and comparative examples was cut to prepare a strip piece having a width of 25 mm and a length of 60 mm, and the strip piece was used as a test sample. An aluminum plate having a width of 40 μm and a thickness of 100 μm and having a 25 μmφ stainless wire disposed at the center was disposed on the sealant surface of the strip piece. Here, the center of the strip piece and the center of the aluminum plate were made coincident with each other. Further, the tip of the wire was clamped on the negative side, the stainless steel foil as a strip piece was clamped on a positive side, and they were set in a tester. The tester was prepared so as to generate a conduction (short-circuit) signal at the time when the applied voltage was 500 V or less, and the resistance was 200 M ohms or less. The above-mentioned strip piece, wire and aluminum plate were heat-sealed at 190° C. and 1 MPa, and the time until generation of the short-circuit signal was measured. The results are shown in Table 2.

(Observation of Heat-Sealed Portion after Heat-Sealing)

The battery packaging material obtained in each of the above-described examples and comparative examples was cut to a size of 80 mm×150 mm, and then cold-molded to a depth of 1.0 mm at 0.4 MPa using a mold (female mold)

having an opening size of 35 mm×50 mm and a mold (male mold) corresponding thereto, so that a recess portion was formed at the central part of the battery packaging material. The concave portion was filled with 1 g of the electrolytic solution (ethylene carbonate, diethyl carbonate and dimethyl carbonate (volume ratio 1:1:1) mixed so as to contain 1 M LiPF$_6$), another battery packaging material cut to a size of 80 mm×150 mm was superimposed on the concave portion in such a manner that the heat-sealable resin layers faced each other, and the battery packaging materials are heat-sealed at the peripheral edge portion. The following two heat-sealing conditions were employed: condition 1) 170° C., pressure: 0.5 MPa and 2.0 seconds; and condition 2) 190° C., 1.0 MPa and 3.0 seconds. Thereafter, the electrolytic solution was removed, the heat-sealed portion was broken so as to be exposed, and a so called "polymer sump" part of the heat-sealed portion was visually observed. The results are shown in Table 2.

TABLE 1A

|  | Base material layer 1 (μm) | Adhesive layer 2 (μm) | Barrier layer (μm) | Chemical conversion treatment layer (treated surface) |
|---|---|---|---|---|
| Example 1A | PET (5.5) | Adhesive (3) | Austenite-based stainless steel foil (20) | Phosphoric acid chromate treatment (both surfaces) |
| Example 2A | PET (5.5) | Adhesive (3) | Austenite-based stainless steel foil (10) | Chromate treatment (one surface) |
| Example 3A | PET (5.5) | Adhesive (3) | Austenite-based stainless steel foil (15) | Alumina treatment (both surfaces) |
| Example 4A | PET (5.5) | Adhesive (3) | Austenite-based stainless steel foil (30) | Cerium treatment (one surface) |
| Example 5A | PBT (6) | Adhesive (3) | Austenite-based stainless steel foil (25) | Phosphoric acid chromate treatment (both surfaces) |
| Example 6A | PEN (6) | Adhesive (3) | Austenite-based stainless steel foil (25) | Phosphoric acid chromate treatment (one surface) |
| Example 7A | Nylon (15) | Adhesive (3) | Austenite-based stainless steel foil (30) | Phosphoric acid chromate treatment (both surfaces) |
| Example 8A | PET/nylon co-extruded film (15) | Adhesive (3) | Austenite-based stainless steel foil (20) | Phosphoric acid chromate treatment (one surface) |
| Example 9A | Solution coating (9) | — | Austenite-based stainless steel foil (10) | Phosphoric acid chromate treatment (both surfaces) |
| Example 10A | PET (9) | Black carbon adhesive (3) | Austenite-based stainless steel foil (30) | Phosphoric acid chromate treatment (both surfaces) |
| Example 11A | Black carbon-containing PC (9) | Adhesive (3) | Austenite-based stainless steel foil (15) | Phosphoric acid chromate treatment (both surfaces) |
| Example 12A | Silica matte-coated PET/black printing layer on adhesive layer side (9) | Adhesive (3) | Austenite-based stainless steel foil (20) | Phosphoric acid chromate treatment (both surfaces) |
| Example 13A | Silica matte-coated nylon (12) | Black carbon adhesive (3) | Austenite-based stainless steel foil (20) | Phosphoric acid chromate treatment (both surfaces) |
| Example 14A | Black carbon-colored matte-coated (silica-containing) PET (9) | Adhesive (3) | Austenite-based stainless steel foil (35) | Phosphoric acid chromate treatment (both surfaces) |
| Example 15A | Black carbon-colored matte coating (6) | — | Austenite-based stainless steel foil (10) | Phosphoric acid chromate treatment (both surfaces) |
| Example 16A | PET (5.5) | Adhesive (3) | Austenite-based stainless steel foil (20) | Phosphoric acid chromate treatment (both surfaces) |
| Example 17A | PET (5.5) | Adhesive (3) | Ferrite-based stainless steel foil (20) | Phosphoric acid chromate treatment (both surfaces) |
| Comparative Example 1A | PET (5.5) | Adhesive (3) | Aluminum foil (20) | Phosphoric acid chromate treatment (both surfaces) |
| Comparative Example 2A | PET (5.5) | Adhesive (3) | Austenite-based stainless steel foil (20) | — |

|  | Adhesive layer 5 | | | Sealant layer 4 | | | | Total |
|---|---|---|---|---|---|---|---|---|
|  | Resin (μm) | Melting point (° C.) | MFR | Resin (μm) | Melting point (° C.) | MFR | Lamination method | thickness (μm) |
| Example 1A | Acid-modified PP (14) | 160 | 5 | Random PP (10) | 140 | 12 | Co-extrusion/ heat treatment | 52.5 |
| Example 2A | Acid-modified PP (14) | 160 | 5 | Random PP (10) | 140 | 12 | Co-extrusion/ heat treatment | 42.5 |
| Example 3A | Fluororesin + isocyanate (4) | — | — | Block/ random (8/2) | 160/140 | 2/15 | Solution coating of adhesive layer 2 + aging | 37.5 |
| Example 4A | Acid-modified PP (10) | 160 | 10 | Random PP (20) | 140 | 20 | Heat lamination | 68.5 |
| Example 5A | Acid-modified PP (10) | 160 | 10 | Random PP (20) | 140 | 20 | Heat lamination | 64 |
| Example 6A | Acid-modified PP (20) | 160 | 3 | Block PP (10) | 160 | 3 | Co-extrusion | 64 |
| Example 7A | Acid-modified PP + oxazoline (2) | 120 | — | Random PP (10) | 140 | 12 | Solution coating of adhesive layer 2 + aging | 60 |

TABLE 1A-continued

| | | | | | | | | |
|---|---|---|---|---|---|---|---|---|
| Example 8A | Acid-modified PP + epoxy + acid catalyst (2) | 100 | — | Random PP/block/random PP (2/15/2) | 140/160/140 | 2/15/2 | Solution coating of adhesive layer 2 + aging | 59 |
| Example 9A | Acid-modified PP + epoxy + acid catalyst (2) | 120 | — | Random/block/random (2/15/2) | 140/160/140 | 2/15/2 | Solution coating of adhesive layer 2 + aging | 40 |
| Example 10A | Acid-modified PP (14) | 160 | 5 | Random PP (10) | 140 | 12 | Co-extrusion/heat treatment | 66 |
| Example 11A | Acid-modified PP + filler (10) | 120 | 15 | Random PP (20) | 120 | 15 | Sandwich lamination | 57 |
| Example 12A | Acid-modified PP (10) | 120 | 15 | Random PP (20) | 120 | 15 | Heat lamination | 62 |
| Example 13A | Acid-modified PP + epoxy + acid catalyst (20) | 120 | 5 | Random PP/block PP/random PP (2/11/2) | 140/160/140 | 2/15/2 | Solution coating of adhesive layer 2 + aging | 70 |
| Example 14A | Acid-modified PP (20) | 130 | 20 | Random PP (20) | 135 | 10 | Sandwich lamination | 87 |
| Example 15A | Acid-modified PP + epoxy (2) | 100 | — | Random/block/random (2/15/2) | 140/160/140 | 2/15/2 | Solution coating of adhesive layer 2 + aging | 37 |
| Example 16A | Acid-modified PP (14) | 160 | 30 | Random PP (10) | 120 | 30 | Co-extrusion/heat treatment | 52.5 |
| Example 17A | Acid-modified PP (14) | 160 | 5 | Random PP (10) | 140 | 12 | Co-extrusion/heat treatment | 52.5 |
| Comparative Example 1A | Acid-modified PP (14) | 160 | 3 | Random PP (10) | 140 | 12 | Co-extrusion/heat treatment | 52.5 |
| Comparative Example 2A | Acid-modified PP (14) | 160 | 5 | Random PP (10) | 140 | 12 | Co-extrusion/heat treatment | 52.5 |

TABLE 2A

| | Piercing test | | | Moldability | | Electrolytic solution resistance delaminated or not | Insulation quality Short-circuit time | Observation of polymer sump after heat-sealing | |
|---|---|---|---|---|---|---|---|---|---|
| | Piercing strength | Piercing strength/total thickness of laminate | Piercing strength/thickness of stainless steel foil | Molding depth (mm) | Molding depth/thickness of stainless steel foil | | (seconds) | 170° C. | 190° C. |
| Example 1A | 27.2 | 0.5 | 1.4 | 2.7 | 0.14 | Not delaminated | 6 | Slight irregularities present, and uneven | Even |
| Example 2A | 19.2 | 0.5 | 1.9 | 1.7 | 0.17 | Not delaminated | 4 | Slight irregularities present, and uneven | Even |
| Example 3A | 22.4 | 0.6 | 1.5 | 2.2 | 0.15 | Not delaminated | 17 | Slight irregularities present, and uneven | Even |
| Example 4A | 38.4 | 0.6 | 1.3 | 3.2 | 0.11 | Not delaminated | 11 | Slight irregularities present, and uneven | Even |
| Example 5A | 34.6 | 0.5 | 1.4 | 2.8 | 0.11 | Not delaminated | 10 | Slight irregularities present, and uneven | Even |
| Example 6A | 35.6 | 0.6 | 1.4 | 2.8 | 0.11 | Not delaminated | 10 | Slight irregularities present, and uneven | Even |
| Example 7A | 48.4 | 0.8 | 1.6 | 4 | 0.13 | Not delaminated | 16 | Slight irregularities present, and uneven | Even |
| Example 8A | 34.2 | 0.6 | 1.7 | 2.5 | 0.13 | Not delaminated | 14 | Slight irregularities present, and uneven | Even |
| Example 9A | 26.2 | 0.7 | 2.6 | 1.5 | 0.15 | Not delaminated | 14 | Slight irregularities present, and uneven | Even |
| Example 10A | 41.4 | 0.6 | 1.4 | 3.5 | 0.12 | Not delaminated | 6 | Even | Even |
| Example 11A | 25.4 | 0.4 | 1.7 | 2 | 0.13 | Not delaminated | 9 | Even | Even |
| Example 12A | 25.4 | 0.4 | 1.3 | 2 | 0.10 | Not delaminated | 4 | Even | Even |
| Example 13A | 35.2 | 0.5 | 1.8 | 2.8 | 0.14 | Not delaminated | 16 | Even | Even |
| Example 14A | 44.6 | 0.5 | 1.3 | 4 | 0.11 | Not delaminated | 16 | Even | Even |
| Example 15A | 19.2 | 0.5 | 1.9 | 1.1 | 0.11 | Not delaminated | 16 | Even | Even |
| Example 16A | 27.2 | 0.5 | 1.4 | 2.2 | 0.11 | Not delaminated | 6 | Many irregularities present | Slight irregularities present |
| Example 17A | 18 | 0.3 | 0.6 | 1.3 | 0.07 | Not delaminated | 4 | Slight irregularities present, and uneven | Even |
| Comparative Example 1A | 8 | 0.2 | 0.4 | 3 | 0.15 | Not delaminated | 6 | Slight irregularities present, and uneven | Even |

TABLE 2A-continued

| | Piercing test | | Moldability | | Electrolytic solution resistance delaminated or not | Insulation quality Short-circuit time | Observation of polymer sump after heat-sealing | |
|---|---|---|---|---|---|---|---|---|
| | Piercing strength | Piercing strength/total thickness of laminate | Piercing strength/thickness of stainless steel foil | Molding depth (mm) | Molding depth/thickness of stainless steel foil | | | 170° C. | 190° C. |
| | | | | | | | (seconds) | | |
| Comparative Example 2A | 27.2 | 0.5 | 1.4 | 2.2 | 0.11 | Delaminated | 6 | Slight irregularities present, and uneven | Even |

<Production of Battery Packaging Material>

Example 1B

A stainless steel foil (thickness: 20 μm) subjected to a chemical conversion treatment at both surfaces was laminated on stretched polyethylene terephthalate film (thickness: 25 μm) as a base material layer using a dry lamination method. Specifically, a two-liquid urethane adhesive (polyol compound and aromatic isocyanate-based compound) was applied to one surface of the stainless steel foil, so that an adhesive layer (thickness: 3 μm) was formed on the stainless steel foil. The adhesive layer on the stainless steel foil and the base material layer were then laminated to each other by a dry lamination method, and an aging treatment was performed at 40° C. for 24 hours to prepare a laminate of base material layer/adhesive layer/stainless steel foil. The chemical conversion treatment of the stainless steel foil was performed by applying to both the surfaces of the stainless steel foil a treatment liquid containing a phenol resin, a chromium fluoride compound and phosphoric acid using a roll coating method in such a manner that the application amount of chromium was 10 mg/m² (dry weight), and performing baking for 20 seconds under such conditions that the film temperature was 180° C. or higher. Next, a two-liquid urethane adhesive (polyol compound and aromatic isocyanate-based compound) was applied onto the stainless steel foil of the laminate, so that an adhesive layer (thickness: 3 μm) was formed on the stainless steel foil. The adhesive layer on the stainless steel foil, and a stretched polyethylene terephthalate film (thickness: 25 μm) as a second protective layer were then laminated to each other by a dry lamination method, and an aging treatment was performed at 40° C. for 24 hours to prepare a laminate of base material layer/adhesive layer/stainless steel foil/adhesive layer/second protective layer. Next, as a heat-sealable resin layer, a 25 μm-thick carboxylic acid-modified polypropylene film (disposed on the second protective layer side) and a 15 μm-thick random polypropylene film (on the innermost layer side) were extruded onto the second protective layer to obtain a battery packaging material in which a base material layer, an adhesive layer, a stainless steel foil, an adhesive layer, a second protective layer and a heat-sealable resin layer (including two layers) were laminated in this order.

Example 2B

A stainless steel foil (thickness: 20 μm) subjected to a chemical conversion treatment at both surfaces was laminated on stretched polyethylene terephthalate film (thickness: 9 μm) as a base material layer using a dry lamination method. Specifically, a two-liquid urethane adhesive (polyol compound and aromatic isocyanate-based compound) was applied to one surface of the stainless steel foil, so that an adhesive layer (thickness: 3 μm) was formed on the stainless steel foil. The adhesive layer on the stainless steel foil and the base material layer were then laminated to each other by a dry lamination method, and an aging treatment was performed at 40° C. for 24 hours to prepare a laminate of base material layer/adhesive layer/stainless steel foil. The chemical conversion treatment of the stainless steel foil was the same as in Example 1B. Next, a two-liquid urethane adhesive (polyol compound and aromatic isocyanate-based compound) was applied onto the stainless steel foil of the laminate, so that an adhesive layer (thickness: 3 μm) was formed on the stainless steel foil. The adhesive layer on the stainless steel foil, and an unstretched polypropylene film (thickness: 25 μm) as a second protective layer and a heat-sealable resin layer were then laminated to each other by a dry lamination method, and an aging treatment was performed at 40° C. for 24 hours to obtain a battery packaging material in which a base material layer, an adhesive layer, a stainless steel foil, an adhesive layer and a second protective layer (heat-sealable resin layer) were laminated in this order.

Comparative Example 1B

A stainless steel foil (thickness: 20 μm) subjected to a chemical conversion treatment at both surfaces was laminated on stretched polyethylene terephthalate film (thickness: 9 μm) as a base material layer using a dry lamination method. Specifically, a two-liquid urethane adhesive (polyol compound and aromatic isocyanate-based compound) was applied to one surface of the stainless steel foil, so that an adhesive layer (thickness: 3 μm) was formed on the stainless steel foil. The adhesive layer on the stainless steel foil and the base material layer were then laminated to each other by a dry lamination method, and an aging treatment was performed at 40° C. for 24 hours to prepare a laminate of base material layer/adhesive layer/stainless steel foil. The chemical conversion treatment of the stainless steel foil was the same as in Example 1B. Next, as a heat-sealable resin layer, a 14 μm-thick carboxylic acid-modified polypropylene film (disposed on the stainless steel foil side) and a 10 μm-thick random polypropylene film (on the innermost layer side) were extruded onto the stainless steel foil to obtain a battery packaging material in which a base material layer, an adhesive layer, a stainless steel foil and a heat-sealable resin layer (including two layers) were laminated in this order.

<Measurement of Ratio of Generation of Pinholes>

Each battery packaging material obtained as described above was cut to a rectangle of 80 mm×120 mm to prepare a sample. Using a mold (female mold) having an opening size of 30 mm×50 mm and a corresponding mold (male mold), the sample was cold-molded under the condition of a pressing force of 0.4 MPa and a molding depth of 4.0 mm. This procedure was carried out for 10 samples at each depth. The sample after cold molding was folded in four so as to form a peak portion p as shown in FIGS. 4 and 5, whether or not pinholes were generated in the peak portion p was visually checked, and the ratio of generation of pinholes was determined. The results are shown in Table 1.

(Phosphoric Acid Chromate Treatment)

A treatment liquid containing an aminated phenol polymer, a trichromium compound and a phosphorus compound was applied to a surface of a stainless steel foil or an aluminum foil by a roll coating method in such a manner that an acid resistance film layer contained the phosphorus compound in an amount as shown in Table 1C (in terms of phosphorus), and baking was performed for 20 seconds under a condition of a film temperature of 180° C. or higher. The content of the phosphorus compound (in terms of phosphorus) in the acid resistance film layer was measured by X-Ray Fluorescence Spectrometer XRF-1800 manufactured by Shimadzu Corporation. Maximum values and minimum values measured at five spots (N=5) are shown in table 1. For acid resistance film layers each having a known

TABLE 1B

| | First protective layer | | Second protective layer | | Ratio of generation of pinholes in peak |
|---|---|---|---|---|---|
| | Layer | Elastic modulus (MPa) | Layer | Elastic modulus (MPa) | portions of samples folded in four (the number of pinholes/10 peak portions) |
| Example 1B | Base material layer (stretched PET) | 3920 | Stretched PET | 4040 | 5 |
| Example 2B | Base material layer (stretched PET) | 3920 | Unstretched PP | 150 | 8 |
| Comparative Example 1B | Base material layer (stretched PET) | 3920 | — | 30 | 10 |

In Table 1B, "PET" represents polyethylene terephthalate, and "PP" represents polypropylene.

As shown in Table 1B, in examples 1B and 2B where a protective layer having an elastic modulus of 100 MPa or more was formed on both surfaces, generation of pinholes in the peak portion p of the sample folded in four after molding was suppressed even when a stainless steel foil was laminated on the battery packaging material. Particularly, in example 1B where a stretched polyethylene terephthalate film was laminated on the heat-sealable resin layer side, the ratio of generation of pinholes was reduced to 50% although severe molding conditions involving use of a stainless steel foil were employed. On the other hand, in Comparative Example 1B where such a protective layer was provided on only the base material layer side, pinholes were generated in the peak portion p in all samples.

Examples 1C to 10C and Comparative Example 1C

A polyethylene terephthalate (PET) film (thickness: 9 μm) as a base material layer was coated with an adhesive including a polyester resin as a main agent and a TDI-based isocyanate as a curing agent (thickness after drying: 3 μm), drying was performed, a barrier layer (thickness: 20 μm) provided with an acid resistance film layer (formed by the later-described phosphoric acid chromate treatment) having a phosphorus compound content as described in Table 1 was then laminated, and an aging treatment was performed at 80° C. for 3 days. Thereafter, an adhesive layer (acid-modified PP, thickness: 14 μm) obtained by blending an acid-modified propylene-ethylene copolymer and low-density polyethylene, and a heat-sealable resin layer including random polypropylene were laminated (thickness: 10 μm) to the other surface by a co-extrusion method. Further, for increasing adhesive strength, the resulting laminate was heated for 30 seconds at 180° C., a temperature equal to or higher than the softening point of the acid-modified PP.

phosphorus compound content, the intensity of the phosphorus compound is measured by the X-ray fluorescence spectrometer, a calibration curve is prepared for the relationship between a mass and an intensity, and from the calibration curve, the measured value of the content of the phosphorus compound (in terms of phosphorus) (mg/m$^2$) can be calculated.

(Evaluation of Electrolytic Solution Resistance)

The battery packaging material obtained in each of Examples 1C to 10C and Comparative Example 1C was cut to a rectangle of 15 mm×80 mm to prepare a test piece. Next, each test piece was put in a glass bottle containing 80 ml of an electrolytic solution (ethylene carbonate, diethyl carbonate and dimethyl carbonate (volume ratio 1:1:1) mixed so as to contain 1 M LiPF$_6$), and left standing in an oven at 85° C. for a predetermined time (a time for each test piece is described in Table 1). Next, the test piece was taken from the electrolytic solution, and delaminated between the barrier layer and the heat-sealable resin layer using an autograph (SHIMAZU AUTOGRAPH AG-X Plus) to measure the tensile strength. As measurement conditions for the tensile strength, the tension direction was 180°, the tension speed was 50 mm/minute, and the measurement atmospheric temperature was room temperature. The results are shown in Table 1.

(Piercing Test)

The battery packaging material obtained in each of Examples 1C to 10C and Comparative Example 1C was cut to prepare a strip piece of 120 mm×80 mm, and the strip piece was used as a test sample. The piercing strength of each test sample was measured by a method conforming to JIS Z 1707 1997 using a piercing tester (MX2-500N manufactured by IMADA CO., LTD.). The results are shown in Table 1C.

TABLE 1C

| | | Content of phosphorus compound (in terms of phosphorus) in chemical conversion treatment layer N = 5 | | Peeling strength after elapse of predetermined time after immersion in electrolytic solution (N/15 mm) | | | | Piercing strength |
|---|---|---|---|---|---|---|---|---|
| | Barrier layer | Minimum value (mg/m$^2$) | Maximum value (mg/m$^2$) | 0 hour | 72 hours | 168 hours | 336 hours | (N) |
| Comparative Example 1C | Aluminum foil | 1.9 | 42.3 | 4.7 | 4.3 | 3.6 | 3.8 | 14 |
| Example 1C | Ferrite-based stainless steel foil | 2.2 | 38.0 | 4.3 | 4.1 | 4.1 | 2.2 | 35 |
| Example 2C | Austenite-based stainless steel foil | 0.9 | 42.6 | 4.9 | 4.3 | 4.1 | 2 | 35 |
| Example 3C | Austenite-based stainless steel foil | 0.3 | 20.2 | 5 | 4.2 | 4 | 1.5 | 35 |
| Example 4C | Ferrite-based stainless steel foil | 0.3 | 22.6 | 4.6 | 4.2 | 4 | 1.4 | 35 |
| Example 5C | Austenite-based stainless steel foil | 120.3 | 190.4 | 5.5 | 5.6 | 5.5 | 5.5 | 35 |
| Example 6C | Austenite-based stainless steel foil | 200.6 | 298.3 | 5.6 | 5.5 | 5.5 | 5.4 | 35 |
| Example 7C | Austenite-based stainless steel foil | 326.4 | 387.5 | 5.5 | 5.4 | 5.4 | 5.5 | 35 |
| Example 8C | Ferrite-based stainless steel foil | 109.5 | 178.1 | 5.4 | 5.6 | 5 | 5.1 | 35 |
| Example 9C | Ferrite-based stainless steel foil | 215.4 | 291.1 | 5.5 | 5.6 | 5.4 | 5.5 | 35 |
| Example 10C | Ferrite-based stainless steel foil | 325.7 | 370.6 | 5.5 | 5.5 | 5.4 | 5.3 | 35 |

DESCRIPTION OF REFERENCE SIGNS

1: Base material layer
2: Adhesive layer
3: Stainless steel foil
3a, 3b: Acid resistance film layer
4: Heat-sealable resin layer
5: Adhesive layer
6a: First protective layer
6b: Second protective layer
31: First surface
32: Second surface
p: Peak portion

The invention claimed is:

1. A battery packaging material including a laminate including at least a base material layer, a stainless steel foil and a heat-sealable resin layer in this order, wherein
an acid resistance film layer is formed on the stainless steel foil on at least the heat-sealable resin layer side, and
the acid resistance film layer contains a phosphorus compound in an amount of 100 mg or more in terms of phosphorus per 1 m$^2$ of surface area of the stainless steel foil.

2. The battery packaging material according to claim 1, wherein the stainless steel is SUS 304 stainless steel.

3. The battery packaging material according to claim 1, wherein the acid resistance film layer is formed by a phosphoric acid chromate treatment using a resin.

4. The battery packaging material according to claim 3, wherein the resin to be used in the phosphoric acid chromate treatment is a phenol resin.

5. The battery packaging material according to claim 1, wherein at least one of the layers situated on the base material layer from the stainless steel foil is black.

6. The battery packaging material according to claim 1, wherein
an adhesive layer is laminated between the base material layer and the stainless steel foil, and
the adhesive layer is colored black.

7. The battery packaging material according to claim 1, wherein the heat-sealable resin layer has a melt flow rate (MFR) of 15 g/10 minutes or less at 230° C.

8. A battery packaging material including a laminate including at least a stainless steel foil having a first surface and a second surface, a base material layer laminated on the first surface, and a heat-sealable resin layer laminated on the second surface, wherein
at least one layer laminated on the first surface of the stainless steel foil forms a first protective layer having an elastic modulus of 100 MPa or more as measured by a method conforming to JIS K7127,
at least one layer laminated on the second surface of the stainless steel foil forms a second protective layer having an elastic modulus of 100 MPa or more as measured by a method conforming to JIS K7127,
an acid resistance film layer is formed on the stainless steel foil on at least the second surface of the stainless steel foil, and
the acid resistance film layer contains a phosphorus compound in an amount of 100 mg or more in terms of phosphorus per 1 m$^2$ of surface area of the stainless steel foil.

9. The battery packaging material according to claim 8, wherein the base material layer forms the first protective layer.

10. The battery packaging material according to claim 8, comprising the second protective layer between the stainless steel foil and the heat-sealable resin layer.

11. The battery packaging material according to claim 1, wherein the stainless steel foil is formed of austenite-based stainless steel.

12. The battery packaging material according to claim 1, further comprising an adhesive layer between the stainless steel foil and the heat-sealable resin layer.

13. The battery packaging material according to claim 1, wherein a thickness of the stainless steel foil is 40 μm or less.

14. The battery packaging material according to claim 1, wherein a total thickness of the laminate is 110 μm or less.

15. The battery packaging material according to claim 1, wherein where T is a total thickness (μm) of the laminate, TS is a thickness (μm) of the stainless steel foil, and F is a piercing strength (N) of the laminate as measured by a measurement method conforming to JIS Z 1707 1997, F/T is 0.3 (N/μm) or more, and F/TS is 0.7 (N/μm) or more.

16. A battery, wherein a battery element including at least a positive electrode, a negative electrode and an electrolyte is stored in a package formed of the battery packaging material according to claim 1.

17. A stainless steel foil for a battery packaging material including a laminate including at least a base material layer, the stainless steel foil and a heat-sealable resin layer in this order, wherein
- an acid resistance film layer is formed on the surface of the stainless steel foil, and
- the acid resistance film layer contains a phosphorus compound in an amount of 100 mg or more in terms of phosphorus per 1 $m^2$ of surface area of the stainless steel foil.

* * * * *